United States Patent
Lim et al.

(10) Patent No.: US 8,649,629 B2
(45) Date of Patent: Feb. 11, 2014

(54) IMAGE ENHANCEMENT METHOD AND SYSTEM

(75) Inventors: Chae Whan Lim, Daegu (KR); Jong In Kwak, Daegu (KR); Ick Hoon Jang, Daegu (KR); Doo Hyun Choi, Daegu (KR); Nam Chul Kim, Daegu (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 1648 days.

(21) Appl. No.: 11/902,096

(22) Filed: Sep. 19, 2007

(65) Prior Publication Data
US 2008/0101719 A1 May 1, 2008

(30) Foreign Application Priority Data
Oct. 30, 2006 (KR) .......................... 10-2006-0105912

(51) Int. Cl.
*G06K 9/40* (2006.01)
(52) U.S. Cl.
USPC ............................ 382/274; 382/195; 382/167
(58) Field of Classification Search
USPC ........................................................ 382/274
See application file for complete search history.

(56) References Cited

U.S. PATENT DOCUMENTS

| 6,941,028 | B2 | 9/2005 | Kimmel et al. |
| 2004/0091164 | A1 | 5/2004 | Sakatani et al. |
| 2005/0074163 | A1 | 4/2005 | Shaked |

FOREIGN PATENT DOCUMENTS

| JP | 09-046618 A | 2/1997 |
| KR | 10-1998-0077132 A | 11/1998 |
| KR | 10-2004-0013617 A | 2/2004 |
| KR | 10-2007-0039347 A | 4/2007 |

OTHER PUBLICATIONS

G. Orsini and G. Ramponi, A Modified Retinex for Image Contrast Enhancement and Dynamics Control, IEEE 2003.*
Peter Burt et al, The Laplacian Pyramid as a Compact Image Code, IEEE 1983.*
Tomasi and Manduchi, Bilateral Filtering for Gray and Color Images, IEEE 1998.*

(Continued)

*Primary Examiner* — Chan S Park
*Assistant Examiner* — Mark Roz
(74) *Attorney, Agent, or Firm* — Jefferson IP Law, LLP

(57) ABSTRACT

An image enhancement method and system are provided. The image enhancement method and system are capable of improving image quality by performing gamma corrections on global and local illuminations and reflectance estimated from an input image, in consideration of dynamic range and contrast of the image, respectively. Particularly, in a case of a color image, the red, green, and blue (RGB) component images are converted into hue, saturation, and value (HSV) component images, and the global and local illuminations and reflectance estimated from the V component image. By converting the hue (H), saturation (S), and enhanced value (V) into RGB, an enhanced color image can be obtained.

14 Claims, 26 Drawing Sheets
(16 of 26 Drawing Sheet(s) Filed in Color)

(56) References Cited

OTHER PUBLICATIONS

Ogata M et al: "Dynamic Range Compression Based on Illumination Compensation", IEEE Transactions on Consumer Electronics, IEEE Servicecenter, New York, NY, US LNKD—DOI: 10.1109/30.96415, vol. 47, No. 3, Aug. 1, 2001, pp. 548-558, XP00236441. ISSN: 0098-3063 *Section 4figure 2a*.

Durand F et al: "Fast Bilateral Filtering for the Display of High-Dynamic-Range Images" ACM Transactions on Graphics, ACM, US LNKD—DOI: 10.1145/566570.566574, vol. 20, No. 3, Jul. 1, 2002, pp. 257-266, XP002312495, ISSN: 0730-0301 *Sections 3.3, 5, 5.1, 6figures 2, 6, 10, 12*.

Doo Hyun Choi et al: "Color Image Enhancement Based on Single-Scale Retinex With a JND-Based Nonlinear Filter" Circuits and Systems, 2007. ISCAS 2007. IEEE International Syposium O N, IEEE, PI, May 1, 2007, pp. 3948-3951, XP031182172, ISBN: 978-1-422-0920-4 *This whole document).

\* cited by examiner

IMAGE ENHANCEMENT METHOD AND SYSTEM

PRIORITY

This application claims the benefit under 35 U.S.C. §119(a) of a Korean patent application filed in the Korean Intellectual Property Office on Oct. 30, 2006, and assigned Serial No. 2006-0105912, the entire disclosure of which is hereby incorporated by reference.

BACKGROUND OF THE INVENTION

1. Field of the Invention

The present invention relates to an image enhancement technique. More particularly, the present invention relates to an image enhancement method and system that are capable of improving image quality by performing gamma corrections on global and local illuminations and reflectance estimated from an input image, respectively.

2. Description of the Related Art

With the widespread popularity of digital cameras (including digital camera-equipped mobile phones), taking images has become as commonplace as making a telephone call. However, most images, such as those obtained with a portable digital camera, are obtained in an irregular illumination environment such as fluorescent lamp, sunlight, and street lamp, rather than in an artificially prepared regular illumination environment, e.g. in a studio. Such an image is likely to be deteriorated with an excessively shaded or bright region. Accordingly, various techniques have been proposed for improving the quality of the deteriorated image.

Well known techniques for improving image quality include intensity transformation, histogram modeling, and homomorphic filtering, retinex and Kimmel methods based on an image formation model.

The intensity transformation technique is disclosed by R. C. Gonzalez and R. E. Woods in "Digital Image Processing," Reading, Mass., Addison-Wesley, 1992 and W. K. Pratt, "Digital Image Processing," 2nd ed. New York, Wiley, 1991.

The histogram modeling technique is disclosed by A. K. Jain in "Fundamentals of Digital Image Processing," Enblewood Cliffs, N.J., Prentice-Hall, 1989.

The homomorphic filtering method based on the image formation model is disclosed by J. S. Lim in "Two-Dimensional Signal and Image Processing" Englewood Cliffs, N.J., Prentice-Hall, 1990.

The retinex method is disclosed by D. J. Jobson, Z. Rahman, and G. A. Woodell in "Properties and Performance of a Center/Surround Retinex," IEEE Trans. Image Process., vol. 6, no. 3, pp. 451-462, March 1997, by M. Ogata, T. Tsuchiya, T. Kubozono, and K. Ueda in "Dynamic Range Compression Based on Illumination Compensation," IEEE Trans. Consumer Electron., vol. 47, no. 3, pp. 548-558, August 2001, by R. Kimmel, M. Elad, D. Shaked, R. Keshet, and I. Sobel in "A Variational Framework for Retinex," Int. J. Comput. Vis., vol. 52, no. 1, pp. 7-23, January 2003, and by D. J. Jobson, Z. Rahman, and G. A. Woodell in "A Multi-Scale Retinex for Bridging the Gap Between Color Images and the Human Observation of Scenes," IEEE Trans. Image Process., vol. 6, no. 7, pp. 965-976, July 1997.

The Kimmel method is disclosed in U.S. Pat. No. 6,941,028 and by R. Kimmel, M. Elad. D. Shaked, R. Keshet, and I. Sobel in "A Variational Framework for Retinex," Int. J. Comput. Vis., vol. 52, no. 1, pp. 7-23, January 2003.

All of these methods improve the qualities of images by decreasing a dynamic range of an input image or increasing a contrast of the image.

The intensity transformation method, histogram modeling method, homomorphic filtering method, retinex method and Kimmel method will each be briefly described below. The intensity transformation method improves the quality of an input image by transforming brightness values of the image using a linear function, log function or power function (R. C. Gonzalez and R. E. Woods, "Digital Image Processing," Reading, Mass., Addison-Wesley, 1992 and W. K. Pratt, "Digital Image Processing," 2nd ed. New York, Wiley, 1991). In the case of using a linear function as the transformation function, it is called contrast stretching or gain/offset correction method. In the case of using a power function, it is called gamma correction method. These intensity transformation methods are known to be easily implemented. However, since only one transformation function is used for an entire image, it is difficult, when there exist several regions in the image of which contrasts are different from each other, to increase the contrasts at the same time.

The histogram modeling method obtains an improved image by transforming the input image into an image which has a required form of histogram. In the case that the required form of histogram is uniform, it is called a histogram equalization method. Although the histogram equalization method can be easily implemented as a brightness transformation, it is difficult to increase the contrast of different areas in an image at the same time. For example, the contrast of a simple background distributed in a small area decreases, while the contrast of a simple background distributed in a large area increases. Accordingly, the processed image is unnaturally expressed rather than improved.

In order to overcome this shortcoming, a modified histogram equalization method has been proposed in which an input image is divided into a plurality of blocks and the histogram equalization is applied for each block. Such an algorithm is disclosed by R. C. Gonzalez and R. E. Woods in "Digital Image Processing," Reading, Mass., Addison-Wesley, 1992; by S. M. Pizer, E. P. Amburn, J. D. Austin, R. Cromartie, A. Geselowitz, T. Greer, B. T. H. Romeny, J. B. Zimmerman, and K. Zuiderveld in "Adaptive Histogram Equalization and its Variations," Comput. Vis., Graph., Image Process., vol. 39, no. 3, pp. 355-368, September 1987 and by J. Y. Kim, L. S. Kim; and S. H. Hwang in "An Advanced Contrast Enhancement Using Partially Overlapped Subblock Histogram Equalization," IEEE Trans. Circuits Syst. Video Technol., vol. 11, no. 4, pp. 475-484, April 2001.

The R. C. Gonzalez and R. E. Woods, "Digital Image Processing" Reading, Mass., Addison-Wesley, 1992, discloses a method in which the input image is divided into blocks of pixels; the S. M. Pizer, E. P. Amburn, J. D. Austin, R. Cromartie, A. Geselowitz, T. Greer, B. T. H. Romeny, J. B. Zimmerman, and K. Zuiderveld, "Adaptive Histogram Equalization and its Variations," Comput. Vis., Graph., Image Process., vol. 39, no. 3, pp. 355-368, September 1987, discloses a method in which the blocks are divided without overlapping with each other; the J. Y. Kim, L. S. Kim, and S. H. Hwang, "An Advanced Contrast Enhancement Using Partially Overlapped Sub-block Histogram Equalization," IEEE Trans. Circuits Syst. Video Technol., vol. 11, no. 4, pp. 475-484, April 2001 discloses a histogram equalization method with partially overlapped blocks; and the V. Buzuloiu, M. Ciuc, R. M. Rangayyan, and C. Vertan, "Adaptive-neighborhood Histogram Equalization of Color Images," J. Electron. Imag., vol. 10, no. 2, pp. 445-459, April 2001 discloses a histogram equalization method in which the image is divided into blocks in consideration of the variations of the size and form of the input image. Also, the V. Buzuloiu, M. Ciuc, R. M. Rangayyan, and C. Vertan, "Adaptive-neighborhood Histogram Equalization of Color Images," J. Electron. Imag., vol. 10, no. 2, pp. 445-459, April 2001 discloses a generalized histogram equalization method.

The homomorphic filtering method applies a logarithmic function to the input image and then applies a linear low-pass filter (LPF) and a linear high-pass filter (HPF) to the log signal of the input image. From the respective output, the log signal of the illumination and the log signal of the reflectance are estimated. The estimated log signal of the illumination is multiplied by a value less than 1 for reducing the dynamic range and the estimated log signal of reflectance is multiplied by a value greater than 1 for increasing the contrast. Finally, the two signals are summed at an adder and an exponential function is applied to the sum so as to return to the spatial domain from the log domain. In this method, by multiplying a value greater than 1 to the log signal of the reflectance, the contrast of a bright region in the output image may increase in relation to the contrast of a dark region. So, the characteristic of the human visual system (HVS) is not well reflected. The nonlinear log operation generates harmonics in the frequencies of the input image. This results in variation of the frequency spectrum so as to cause unreliability of estimation on the log signals of the illumination and the reflectance.

Meanwhile, the retinex method based on the retinex theory proposed by E. Land in "An Alternative Technique for the Computation of the Designator in the Retinex Theory of Color Vision," Proc. Nat. Acad. Sci., vol. 83, pp. 3078-3080, May 1986, assumes that the HVS recognizes colors without affection of the illumination.

The retinex method applies a linear LPF for estimating the illumination from the input image and then the reflectance is estimated by removing the estimated illumination from the input image. Only the reflectance is next emphasized. The retinex method proposed by D. J. Jobson, Z. Rahman, and G. A. Woodell in "Properties and Performance of a Center/surround Retinex," IEEE Trans. Image Process., vol. 6, no. 3, pp. 451-462, March 1997 estimates the illumination using a Gaussian-form linear LPF and subtracts the log signal of the estimated illumination from the log signal of the input image so as to estimate the log signal of the reflectance. Without returning to the spatial domain, the reflectance signal estimated in the log domain is used as the output image. Finally, the brightness range of the output image is adjusted by a gain/offset correction in accordance with that of the output device. In the method proposed by Jobson et al., the reflectance of the output image is estimated with a difference between the input image and an illumination estimated using the linear LPF.

Since the output image is given as the estimated reflectance, the output image is characterized in that a dark region becomes darker and a bright region becomes brighter along the edge at which the brightness tends to vary abruptly such that a halo effect appears. However, in a case that the support region of the linear LPF is narrow, the estimated illumination is smoothed in a small area around the edge. So the halo effect appears in a small area around an edge and the local contrast increases. On the other hand, if the support region of the linear LPF is wide, the estimated illumination is smoothed in large area. At this time, the halo effect appears in a large area and the global contrast increases. In order to increase the local contrast and the global contrast simultaneously, a method using the weighted sum of output images by using three linear LPFs having different support regions has been proposed. This method is disclosed by D. J. Jobson, Z. Rahman, and G. A. Woodell in "A Multi-scale Retinex for Bridging the Gap Between Color Images and the Human Observation of Scenes," IEEE Trans. Image Process., vol. 6, no. 7, pp. 965-976, July 1997. Such a retinex method is called multi-scale retinex (MSR), whereas one that uses only one linear low-pass filter is called single-scale retinex (SSR).

The method proposed by Kimmel is disclosed by R. Kimmel, M. Elad, D. Shaked, R. Keshet, and I. Sobel in "A Variational Framework for Retinex," Int. J. Comput. Vis., vol. 52, no. 1, pp. 7-23, January 2003. In this method, the illumination is iteratively estimated using quadratic programming (QP) under a constraint that the illumination of the output image is brighter than or equal to that of the input image over the entire region. The reflectance is estimated by inversing the estimated illumination and multiplying it with the input image. In order to compress the dynamic range of the estimated illumination, the gamma correction is applied and then it is multiplied with the estimated reflectance so as to obtain an output image.

The homomorphic filtering method, retinex (SSR, MSR), and Kimmel method will be described hereinafter with reference to FIGS. 1 to 8 in more detail.

In the conventional image formation model, a grayscale image or a component image of a color image f(x,y) can be expressed as a multiplication of illumination l(x,y) and reflectance r(x,y) in equation (1):

$$f(x,y)=l(x,y)\cdot r(x,y) \tag{1}$$

where it is assumed that the illumination l(x,y) is slowly changed and its frequency spectrum is mostly distributed at low frequency band. Also, it is assumed that the reflectance r(x,y) is rapidly changed due to the reflection characteristics on the surface of an object and its frequency spectrum is mostly distributed at high frequency band. In the conventional image enhancement technique based on the image creation model of equation 1, at least one of the illumination and reflectance is estimated. The estimated illumination is then processed so as to reduce its dynamic range and the estimated reflectance is processed to increase its contrast. An output image is obtained by combining these processed components. Next, the output image is used as it is or is corrected by gain/offset correction for matching the brightness value range of an output device.

Homomorphic Filtering Method

As shown in FIG. 1, the log signal log f(x,y) of the input image is obtained by applying the logarithmic function at logarithmic function block 101. Based on the image formation model of equation 1, the log f(x,y) is expressed as the sum of the log signal log l(x,y) of the illumination and the log signal log r(x,y) of the reflectance as in equation (2).

$$\log f(x,y)=\log l(x,y)+\log r(x,y) \tag{2}$$

The log signal log l(x,y) of the illumination of equation (2) is estimated by applying the LPF 103 to the log signal log f(x,y) of the input image under the assumption that the frequency spectrum is distributed at low frequency band as in equation (3). The log signal log r(x,y) of the reflectance is estimated by applying the HPF 105 as in equation (4) under the assumption that the frequency spectrum of the log signal is of the reflectance is distributed at high frequency band, $$\log \hat{l}(x,y)=LPF[\log f(x,y)] \tag{3}$$

$$\log \hat{r}(x,y)=HPF[\log f(x,y)] \tag{4}$$

where log $\hat{l}$(x,y) is the estimated log signal of illumination, log $\hat{r}$(x,y) is the estimated log signal of reflectance. The estimated log signal log $\hat{l}$(x,y) of the illumination is multiplied by a constant α less than 1 at the multiplier 107 for decreasing the dynamic range, and the estimated log signal log r̂(x,y) of the reflectance is multiplied by a constant β greater than 1 at the multiplier 108 for increasing the contrast. The output signals of the multipliers 107 and 108 are summed at an adder 109 and then the output signal of an adder 109 is processed by the exponential function block 111 so as to be reconstructed. At this time, getting back to the spatial domain obtains the output image f̂(x,y). From the comparison of an input image illustrated in FIG. 2A and an output image illustrated in FIG. 2B, homomorphic filtering method improves the quality of the image. However, the homomorphic filtering method requires the nonlinear log operation such that the log signal f(x,y) of the input image generates harmonics of the frequency spectrum. The harmonics of the frequency spectrum make it difficult to estimate the log signals of the illumination and reflectance. Particularly, the output image f̂(x,y) obtained using the homomorphic filtering method can be expressed by equation (5).

$$\hat{f}(x,y) = \exp(\alpha \cdot \log \hat{i}(x,y) + \beta \cdot \log \hat{r}(x,y)) \quad (5)$$

Rearranging the right terms of the equation 5 with respect to the estimated illumination î(x,y) and the estimated reflectance r̂(x,y) the output image f̂(x,y) can be expressed in a form of the multiplication of the two estimated components enhanced by the gamma correction as shown in equation 6:

$$\hat{f}(x,y) = (\hat{i}(x,y))^\alpha \cdot (\hat{r}(x,y))^\beta \quad (6)$$

where α<1 and β>1. In equation (6), a gamma correction is applied with a gamma factor β greater than 1 to the reflectance in the range of 0~1, the contrast of the image increases in the bright region relative to the dark region, as shown in FIG. 2B. This is because the homomorphic filtering method does not consider that the HVS is more sensitive to the contrast of the dark region than that of the bright region.

FIG. 2A illustrates an input image having strong edges at the center part and dark and weak edges at the left and right parts. FIG. 2B illustrates the output image obtained by applying the homomorphic filtering to the input image of FIG. 2A. In this case, the log signal of the illumination is estimated by separately applying a 1-dimensional Gaussian LPF with a window of 1×5 size in horizontal and vertical directions to the log signal of the input image. The log signal of the reflectance is estimated by subtracting the log î(x,y) from the log f(x,y). The constants α and β are 0.5 and 1.5, respectively. From the output image of FIG. 2B, it is shown that the bright region around the tower shows strong contrast relative to the dark region around trees.

Retinex Method

Typically, retinex methods are classified into SSR and MSR.

FIG. 3 is a block diagram illustrating the SSR method proposed by D. J. Jobson, Z. Rahman, and G. A. Woodell in "Properties and Performance of a Center/surround Retinex," IEEE Trans. Image Process., vol. 6, no. 3, pp. 451-462, March 1997.

In the SSR, the illumination is estimated by applying a linear LPF 301 to the input image f(x,y). The input image is also directed to log function block 305. The output image f̂(x,y) is obtained at adder 307 from a signal taken by removing a log signal log î(x,y) obtained from log function block 303 of the estimated illumination, from the log of the input image obtained from log function block 305 as shown in equation (9):

$$\hat{f}(x,y) = \log f(x,y) - \log \hat{i}(x,y) \quad (9)$$

where î(x,y) is the estimated illumination through a linear low-pass filtering by equation 10.

$$\hat{i}(x,y) = LPF[f(x,y)] \quad (10)$$

The output image f̂(x,y) of equation 9 can be expressed with respect to the estimated illumination î(x,y) by equation (11):

$$\hat{f}(x,y) = (\hat{i}(x,y))^0 \cdot \log(\hat{r}(x,y)) \quad (11)$$

where r̂(x,y) is the reflectance estimated with $$\hat{r}(x,y) = \frac{f(x,y)}{\hat{i}(x,y)}.$$

The SSR represented by equation (11) applies a gamma collection with a factor of α=0 to the estimated illumination î(x,y) such that the affection of illumination is excluded unlike in the homomorphic filtering method. However, the logarithmic function, whose transfer characteristic is similar to the gamma correction with a factor of β=0.3, is applied to the reflectance r̂(x,y) such that the contrast increases excessively at a dark region.

Finally, in order to obtain final output image f̃(x,y) whose brightness value range is adjusted to that of the output device, a gain/offset correction is applied to the output image f̂(x,y) by gain/offset correction function block 309 as in equation 12:

$$\tilde{f}(x,y) = a\hat{f}(x,y) + b \quad (12)$$

where a and b are constants used for the gain/offset correction. The values of a and b affect the final output image f̃(x,y). As disclosed by D. J. Jobson, Z. Rahman and G. A. Woodell in "Properties and Performance of a Center/surround Retinex," IEEE Trans. Image Process., vol. 6, no. 3, pp. 451-462, March 1997, the same values of a and b are used for all images.

FIG. 4 is a diagram illustrating a 1-dimensional signal presenting an edge component of an input image and estimated illumination and reflectance in the SSR method of FIG. 3. In FIG. 4, a linear LPF smoothes the edge component of the input image 401 to estimate the illumination 402 such that the reflectance 403 estimated by a reflectance estimator 405 abruptly decreases or increases around the edge. This causes a halo effect in which the dark region of the input image becomes darker and the bright region of the input image becomes brighter in the output image. The edge region of the smoothed image in the illumination estimated by the linear low-pass filtering varies in size and smoothing degree according to the support region of the filter. The edge region to be smoothed becomes narrow or wide according to the width of the support region of the filter. At this time, the smoothing degree also increases or decrease and the scale of the halo effect increases or decreases. If the support region of the filter is narrow, the halo effect occurs in a small area so the local illumination can be well estimated, resulting in an increase of the local contrast of the image. Conversely, if the support region of the filter is wide, the halo effect occurs in a large area so the global illumination can be well estimated, resulting in an increase of the global contrast of the image. Since the halo effect and the contrast vary according to the support region of the filter, it is required to adjust the support region of the filter. FIGS. 5A to 5C illustrate SSR output images to the input image of FIG. 2A according to the width of the support region of the linear LPF. The constants a and b for the gain/offset correction in equation 12 have values of 192 and −30, respectively, as in D. J. Jobson, Z. Rahman, and G. A. Woodell, "A Multi-scale Retinex for Bridging the Gap Between Color Images and the Human Observation of Scenes," IEEE Trans. Image Process. vol. 6, no. 7, pp. 965-976, July 1997. If the support region of the filter is set to 15 pixels, the halo effect in the output image of SSR in FIG. 5A appears at small areas around the roof and the tower. It shows that the local contrast of the image increases but the global contrast does not increase well. FIG. 5C illustrates an output image of SSR when the support region of the filter is set to 500 pixels. In this case, the halo effect appears in wide areas around the roof and the tower. This means that the global contrast increases but the local contrast does not increase. FIG. 5B illustrates an output image of SSR when the support region of the filter is set to 150 pixels. In this case, the halo effect appears to an extent between those of FIGS. 5A and 5C. The MSR is proposed by D. J. Jobson, Z. Rahman, and G. A. Woodell in "A Multi-scale Retinex for Bridging the Gap Between Color Images and the Human Observation of Scenes," IEEE Trans. Image Process., vol. 6, no. 7, pp. 965-976, July 1997. The MSR is a technique for compensating the variational characteristics of the SSR output images according to the support region of the linear LPF for estimating the illumination. In the MSR, an output image $\hat{f}_{MSR}(x,y)$ is obtained by a weighted sum of the SSR output images taken by using the linear LPFs having different support regions as expressed in equation 13:

$$\hat{f}_{MSR}(x, y) = \sum_{n=1}^{N} w_n \hat{f}_n(x, y) \quad (13)$$

where N is a number of filters, $\hat{f}_n(x,y)$ is an SSR output image taken through the nth filter (n=1,2,...,N), and $w_n$ is a weighting factor. The brightness range of the MSR output image $\hat{f}_{MSR}(x,y)$ is adjusted to that of the output device by applying the gain/offset correction. FIG. 6 illustrates an MSR output image obtained from a weighted sum of the SSR output images of the input image of FIG. 2A with the LPFs of which support regions are 15, 150, and 500 pixels, respectively. Here, the constants a and b for the gain/offset correction in equation (12) are set to 192 and −30 as in equation 8. As shown in FIG. 6, since the advantageous factors of the SSR output images taken through the filters having different support regions are partially combined, both the global and local contrasts are well increased. Although the halo effect is attenuated to some extent, the MSR output image has a residual halo effect because the most SSR output images have halo effects.

FIG. 7 is a block diagram illustrating the Kimmel method. The Kimmel method is disclosed in the U.S. Pat. No. 6,941,028 and by R. Kimmel, M. Elad, D. Shaked, R. Keshet, and I. Sobel in "A Variational Framework for Retinex," Int. J. Comput. Vis., vol. 52, no. 1, pp. 7-23, January 2003. In this method, the illumination is iteratively estimated using a QP 701 under the constraints that the illumination varies slowly in all regions including boundaries and its brightness is greater than or equal to the input image etc. After the illumination is estimated, the reflectance is estimated by passing the estimated illumination $\hat{l}(x,y)$ estimated according to equation (8) through the inverter 707 and multiplying the output of the inverter 707 with the input image f(x,y) at the multiplier 709. The estimated illumination $\hat{l}(x,y)$ is gamma-corrected at the corrector 703 for decreasing the dynamic range. Finally, the output image is obtained by multiplying the gamma-corrected illumination with the estimated reflectance at the multiplier 705 as following equation 14:

$$\hat{f}(x,y) = \hat{l}(x,y)^{\alpha} \cdot \hat{r}(x,y) \quad (14)$$

where $\hat{r}(x,y)$ is an estimated reflectance. This method is advantageous in estimating the reflectance satisfying the constraints. However, the iterative estimation of illumination causes massive computation and no enhancement operation is applied to the $\hat{r}(x,y)$.

In the color image enhancement methods based on the conventional image formation model, the image enhancement in the RGB color space can be expressed by equation (15) by applying the image of equation (1) to the respective component images $f_i(x,y), i \in \{R,G,B\}$.

$$f_i(x,y) = l_i(x,y) \cdot r_i(x,y), i \in \{R,G,B\} \quad (15)$$

On the basis of equation (15), the image enhancement can be applied to each component image of the RGB color image. In this case, the red (R), green (G), and blue (B) components vary independently such that the color variations may be caused by variations of the ratio of the R, G, and B components. The color image enhancement methods are proposed in SSR (D. J. Jobson, Z. Rahman, and G. A. Woodell, "Properties and Performance of a Center/surround Retinex," IEEE Trans. Image Process., vol. 6, no. 3, pp. 451-462, March 1997), MSR, and MSR with Color Restoration (MSRCR) (D. J. Jobson, Z. Rahman, and G. A. Woodell, "A Multi-scale Retinex for Bridging the Gap Between Color Images and the Human Observation of Scenes," IEEE Trans. Image Process., vol. 6, no. 7, pp. 965-976, July 1997). These methods enable obtaining output color images $\hat{f}_i(x,y), i \in \{R,G,B\}$ only with the enhanced reflectance of equation (16).

$$\hat{f}_i(x,y) = (\hat{l}_i(x,y))^0 \cdot \log(\hat{r}_i(x,y)), i \in \{R,G,B\} \quad (16)$$

In equation (16), it is noted that the output image $\hat{f}_i(x,y)$, $i \in \{R,G,B\}$ is obtained regardless of the estimated illumination of the input image.

In a case that the estimated reflectance of the R, G, and B component images have similar values, the R, G, B component ratio becomes 1:1:1 such that a gray-world violation occurs, in which the color of the output image shifts to gray.

In order to overcome this problem, MSRCR is proposed. In the MSRCR, a color restoration process is added as following equation (17):

$$\hat{f}_{MSRCR_i}(x,y) = C_i(x,y) \cdot \hat{f}_{MSR_i}(x,y), i \in \{R,G,B\} \quad (17)$$

where $\hat{f}MSRCR_i(x,y)$ and $\hat{f}_{MSR_i}(x,y)$ are MSRCR output image and an MSR output image of the component image $\hat{f}_i(x,y), i \in \{R,G,B\}$, and $C_i(x,y)$ is a weighting function expressed as equation 18 for color restoration:

$$C_i(x, y) = c \cdot \log\left[ d \cdot \frac{f_i(x, y)}{\sum_{j=1}^{S} f_j(x, y)} \right], i \in \{R, G, B\} \quad (18)$$

where c and d are constants for color restoration, S is the number of the color components of the image. In equations 17 and 18, the RGB component images of the MSRCR output color image are weighted according to the RGB component ratio of the input color image. Accordingly, the output image is presented with a color similar to that of the input color image. Finally, the gain/offset correction of equation 12 is applied to the MSRCR output image $\hat{f}_i(x,y), i \in \{R,G,B\}$ to fit the brightness value range of the output image to that of the output device. FIG. 8A illustrates an input color image, and FIGS. 8B and 8C illustrate MSR and MSRCR output color images for the input color image of FIG. 8A. The constants a and b for the gain/offset correction of equation 12 are set to 192 and −30, respectively, and the constants c and d for the color restoration of equation 18 are set to 46 and 125, respectively, for the MSRCR as proposed by D. J. Jobson, Z. Rahman, and G. A. Woodell, in "A Multi-scale Retinex for Bridging the Gap Between Color Images and the Human Observation of Scenes," IEEE Trans. Image Process., vol. 6, no. 7, pp. 965-976, July 1997. In the MSR output color image of FIG. 8B, it is shown that the contrast of the dark area in the input color image is well enhanced, but the gray-world violation appears. Although the gray-world violation is attenuated to an extent in the MSRCR output color image of FIG. 8C, residual gray-world violation appears. That is, the MSRCR cannot be a solution for avoiding the gray-world violation effect occurred in the MSR.

SUMMARY OF THE INVENTION

An aspect of the present invention is to address at least the above mentioned problems and to provide at least the advantages described below. Accordingly, it is an aspect of the present invention to provide an image enhancement method and system, particularly, for an image degraded by irregular illumination.

It is another aspect of the present invention to provide an image enhancement method and system that are capable of restraining the halo effect by applying a gamma correction with different factors to global illumination, local illumination and reflectance estimated from an input image.

It is another aspect of the present invention to provide an image enhancement method and system that are capable of improving the quality of an image by enhancing global and local illuminations and reflectance estimated from a value (V) component image of the input color image under the assumption of white-light illumination.

It is another aspect of the present invention to provide an image enhancement method and system that are capable of effectively improving an image quality by restraining the halo effect with estimation of global and local illuminations and reflectance of an image.

In accordance with an aspect of the present invention, the above and other objects are accomplished by an image enhancement method. The image enhancement method includes estimating the illumination from an input image, estimating the reflectance by removing the estimated illumination from the input image, correcting the dynamic range of the estimated illumination, correcting the contrast using the estimated reflectance and adjusting a brightness value range of an output image obtained with the corrected dynamic range and contrast to match a brightness value range of an output device.

In accordance with another aspect of the present invention, the above and other objects are accomplished by a color image enhancement method. The color image enhancement method includes converting RGB component images of an input image into HSV component images, estimating a global illumination from V component image among HSV component images, estimating the local illumination using the estimated global illumination and the V component image, estimating a reflectance using the estimated local illumination and the V component image, enhancing the global and local illuminations and the reflectance for decreasing the dynamic ranges of the estimated global and local illuminations and increasing the contrast of the estimated reflectance, outputting an enhanced V by matching the brightness range of an intermediate image obtained by multiplying the global and local illuminations and the reflectance to that of an output device and reproducing an RGB image by combining the enhanced brightness component image with the hue (H) and saturation (S) component images while converting the RGB component images into HSV component images.

BRIEF DESCRIPTION OF THE DRAWINGS

The patent or application file contains at least one drawing executed in color. Copies of this patent or patent application publication with color drawing(s) will be provided by the Office upon request and payment of the necessary fee.

The above and other aspects, features and advantages of certain exemplary embodiments of the present invention will be more apparent from the following detailed description in conjunction with the accompanying drawings, in which.

Throughout the drawings, it should be noted that like reference numbers are used to depict the same or similar elements, features and structures.

DETAILED DESCRIPTION OF EXEMPLARY EMBODIMENTS

The following description with reference to the accompanying drawings is provided to assist in a comprehensive understanding of exemplary embodiments of the present invention as defined by the claims and their equivalents. It includes various specific details to assist in that understanding but these are to be regarded as merely exemplary. Accordingly, those of ordinary skill in the art will recognize that various changes and modifications of the embodiments described herein can be made without departing from the scope and spirit of the invention. Also, detailed descriptions of well-known functions, structures and constructions incorporated herein may be omitted for clarity and conciseness.

Certain terms are used in the following description for convenience and reference only and are not to be construed as limiting. In the following detailed descriptions, only the exemplary embodiments of the invention have been shown and described, simply by way of illustration of the best mode contemplated by the inventors of carrying out the invention. As will be realized, the invention is capable of modification in various obvious respects, all without departing from the invention. Accordingly, the drawings and descriptions are to be regarded as illustrative in nature and not restrictive.

The following definitions are provided to enable a clear and consistent understanding of the detailed description and the claims. Unless otherwise noted, terms are to be understood according conventional usage by those skilled in the relevant art.

An "illumination or lighting" is a degree of visibility of environment by which to see an object and expressed by l, and a "reflectance" is the fraction of incident radiation reflected by a surface and is expressed by r. A "global illumination" is the illumination over the entire image including an object estimated from a predetermined size of image taken by a camera and is expressed by $l_G$, and a "local illumination" is the illumination at a specific area of the entire image and is expressed by $l_L$.

An "estimation" is a state to be predicted before determining the global and local illuminations and the reflectance.

A "gamma correction" is a process for improving the global and local illuminations and reflectance by decreasing the dynamic range and increasing the contrast.

Figure 9:
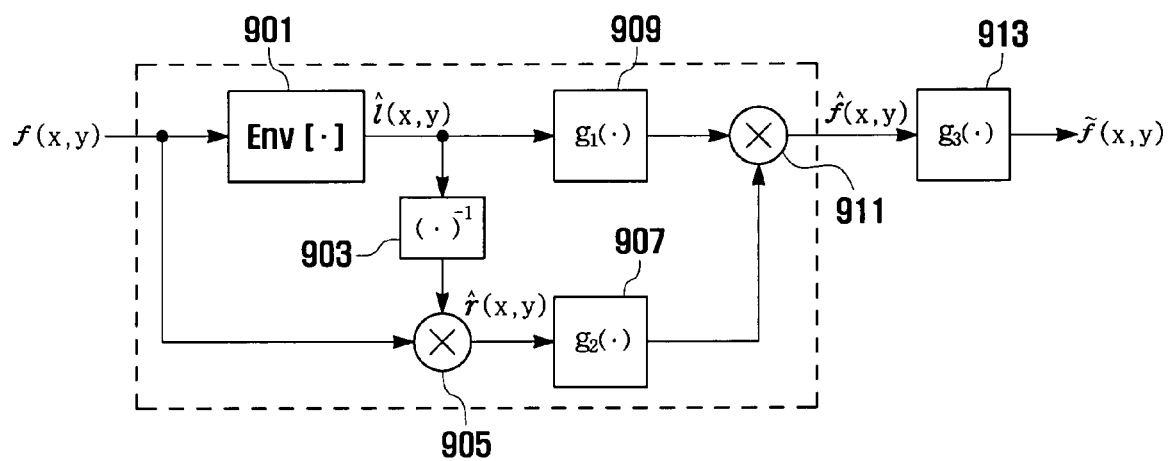
FIG. 9 is a block diagram illustrating a configuration of an image enhancement system according to an exemplary embodiment of the present invention.

FIG. 9 is a block diagram illustrating an image enhancement system according to an exemplary embodiment of the present invention.

In FIG. 9, an input image is enhanced in the illumination and the reflectance. The image enhancement system includes a demodulator 901 for estimating the illumination l(x,y) by applying an envelope detector to an input image f(x,y) an inverter 903 for inverting the illumination output from the demodulator 901, a first multiplier 905 for multiplying the estimated illumination $\hat{l}(x,y)$ with the input image f(x,y) for estimating a reflectance r(x,y) a first corrector 909 for decreasing the dynamic range of the estimated illumination $\hat{l}(x,y)$ output from the demodulator 901, a second corrector 907 for correcting the estimated reflectance $\hat{r}(x,y)$ so as to increase the contrast, a second multiplier 911 for multiplying the outputs from the first and second correctors 909 and 907, and a third corrector 913 for correcting the estimated image $\hat{f}(x,y)$ output from the second multiplier 911 so as to adjust the brightness of the output image $\hat{f}(x,y)$ to that of an output device.

The first to third correctors 909, 907, and 913 perform corrections using a gamma or log function.

The demodulator 901 estimates the illumination l(x,y) from the input image f(x,y) in the following manner. Assuming that a bias is added to an illumination l(x,y) in the image formation model of equation 1, the input image f(x,y) can be expressed with an amplitude modulation (AM) of the illumination l(x,y) with the reflectance r(x,y). Accordingly, the illumination l(x,y) can be estimated using an envelope detector, which is a kind of AM demodulator, as following equation (19):

$$\hat{l}(x,y) = Env[f(x,y)] \quad (19)$$

where Env[●] is the envelope detector.

Figure 1:
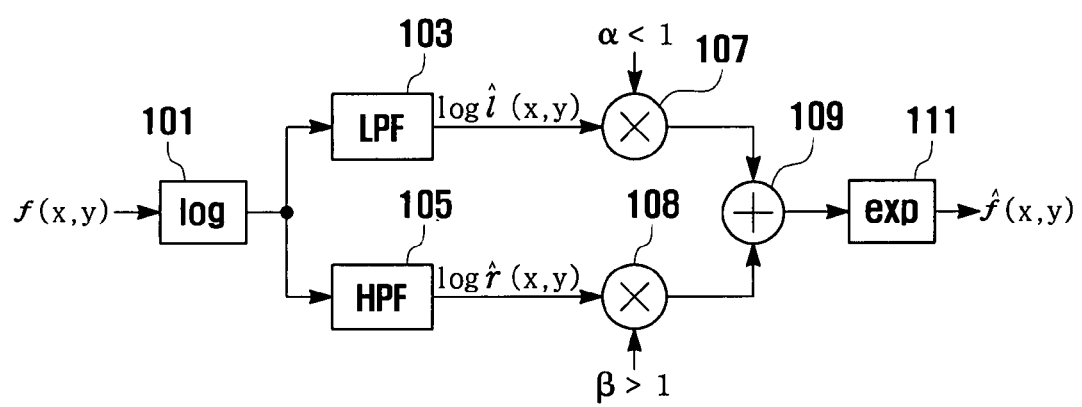
FIG. 1 is a block diagram illustrating a conventional image enhancement system using a homomorphic filtering process.
Figure 2A:
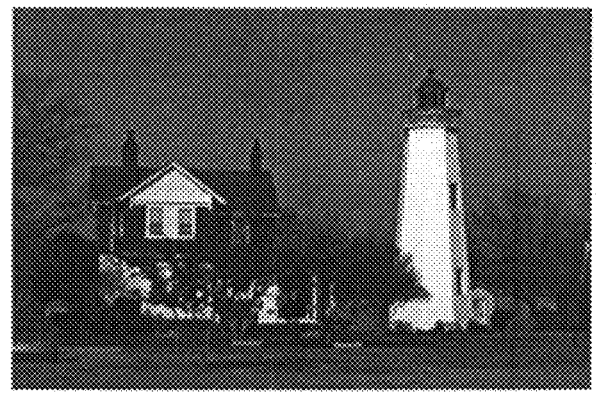
FIGS. 2A and 2B illustrate images before and after applying a homomorphic filtering process of FIG. 1.
Figure 2B:
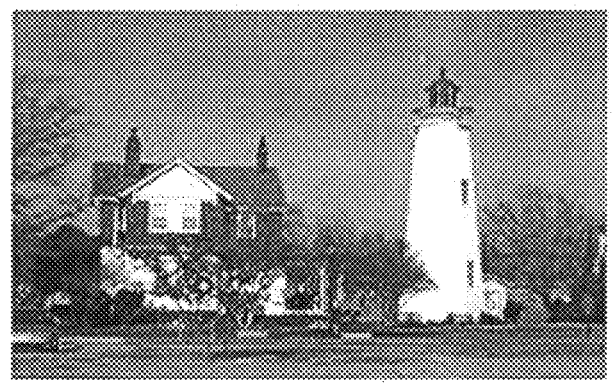
Figure 3:
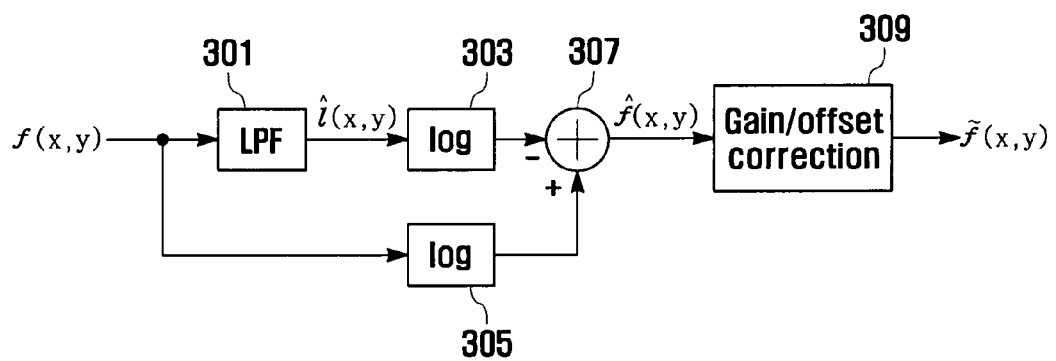
FIG. 3 is a block diagram illustrating a conventional image enhancement system using a SSR method.
Figure 4:
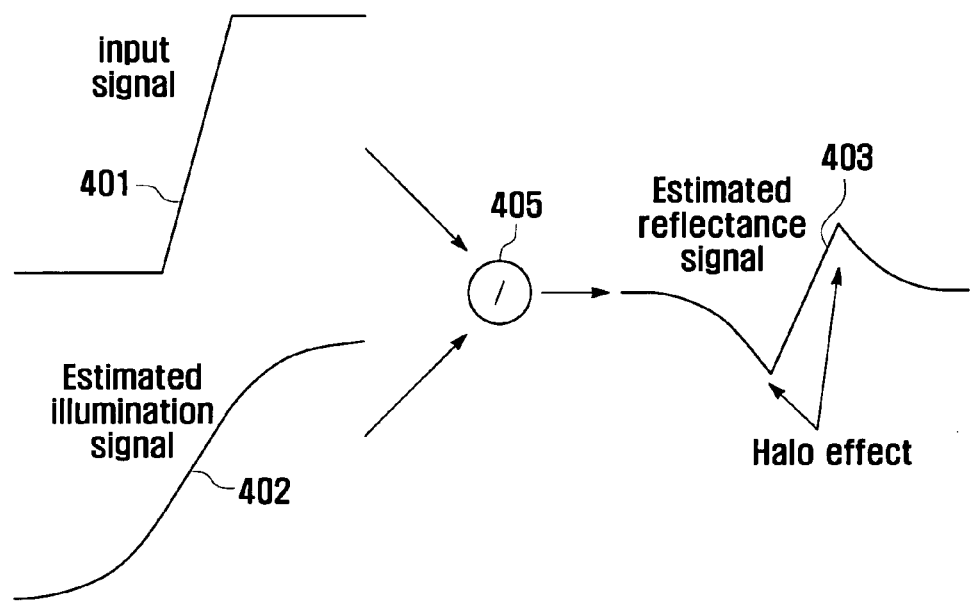
FIG. 4 is a diagram illustrating a 1-dimensional signal presenting edge component of an input image and estimated illumination and reflectance in SSR method of FIG. 3.
Figure 5A:
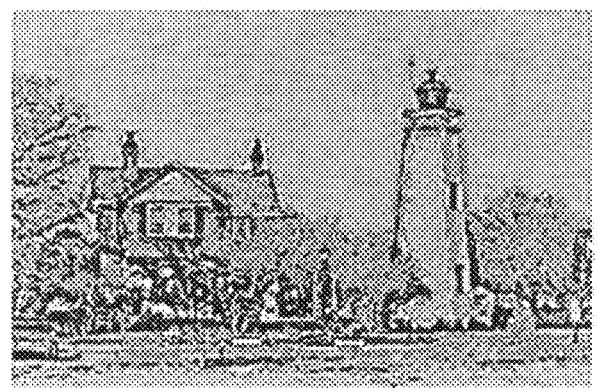
FIGS. 5A to 5C illustrate output images through the SSR method when an effect region of a linear LPF is set to 15, 150, and 500 pixels, respectively.
Figure 5B:
Figure 5C:
Figure 6:
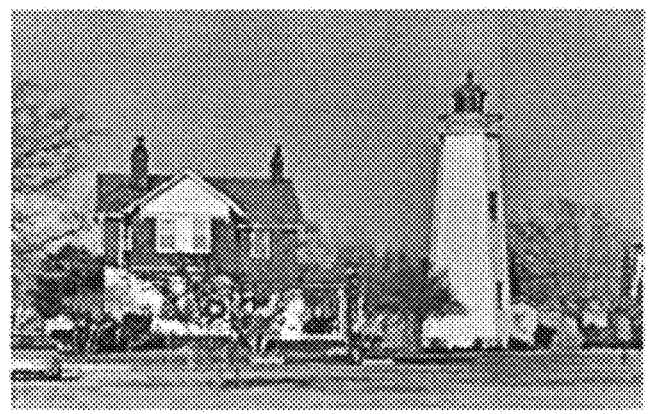
FIG. 6 illustrates an output image of a conventional image enhancement method using MSR when the support regions of the LPFs are 15, 150, and 500 pixels, respectively.
Figure 7:
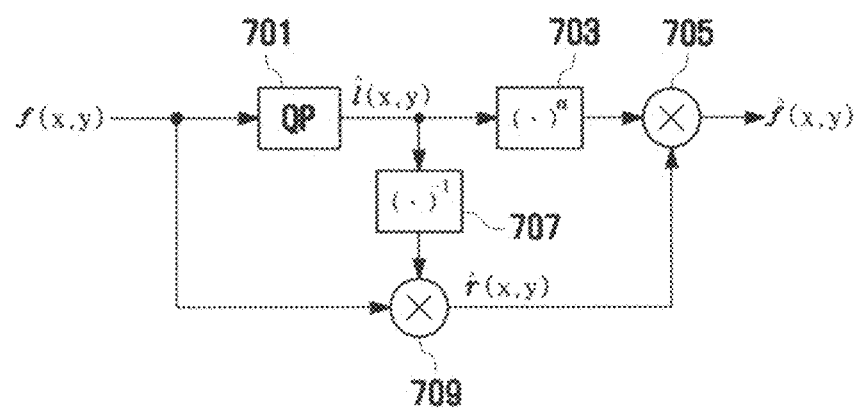
FIG. 7 is a block diagram illustrating a conventional image enhancement system using Kimmel method.

In the homomorphic filtering method, the envelope detector 901 is composed by cascading log(●), linear LPF, and exp(●). In the SSR and MSR proposed by Jobson et al., a Gaussian-form linear LPF is used. In the Kimmel method, the QP 701 (see FIG. 7) is used. The reflectance r(x,y) estimation can be generalized by dividing the input image f(x,y) with the estimated illumination $\hat{l}(x,y)$. In order to estimate the reflectance r(x,y) the estimated illumination $\hat{l}(x,y)$ is inverted by the inverter 903 and then the output of the inverter 903 is multiplied with the input image f(x,y) at the first multiplier 905. The estimated reflectance $\hat{r}(x,y)$ and illumination $\hat{l}(x,y)$ are gamma-corrected at the respective first and second correctors 909 and 907 as in equation 20, and the outputs of the first and second correctors 909 and 907 are multiplied at the second multiplier 911 so as to be output as an intermediate image. The intermediate image is then processed by the third corrector 913 such that an output image $\hat{f}(x,y)$ whose brightness range is adjusted to that of the output device is generated.

$$\hat{f}(x,y) = g_1(\hat{l}(x,y)) \cdot g_2(\hat{r}(x,y)) \quad (20)$$

where $g_1(●)$ is a function for decreasing the dynamic range of the estimated illumination $\hat{l}(x,y)$ output from the demodulator 901, and $g_2(●)$ is a function for increasing the contrast of the estimated reflectance $\hat{r}(x,y)$ output from the first multiplier 905. As the $g_1(●)$ and $g_2(●)$ for the first and second correctors 909 and 907, the power function or log function can be used. In the homomorphic filtering method, $g_1(●)$ and $g_2(●)$ are expressed in the form of $(●)^\alpha$ and $(●)^\beta$ ($\alpha<1, \beta>1$). The SSR and MSR proposed by Jobson et al. use the power function $(●)^0$ and the log function log(●), and the Kimmel method uses the power functions such as $(●)^\alpha$ and $(●)^\beta$ ($\alpha<1, \beta=1$). The outputs of the first and second correctors 909 and 907 are multiplied by the second multiplier 911, and the output of the second multiplier 911 is input to the third corrector 913 so as to output $\hat{f}(x,y)$. The third corrector 913 processes the output of the second multiplier 911 for adjusting the brightness range of the output image to that of the output device. The output image $\tilde{f}(x,y)$ is obtained by equation 21:

$$\tilde{f}(x,y) = g_3(\hat{f}(x,y)) \quad (21)$$

where $g_3(●)$ is a function for adjusting the brightness range of the output image to that of the output device. The function $g_3(\bullet)$ is not used in the homomorphic filtering methods and Kimmel method, and $g_3(\bullet)$ in the SSR and MSR proposed by Jobson et al., is used with gain/offset correction.

Figure 10:
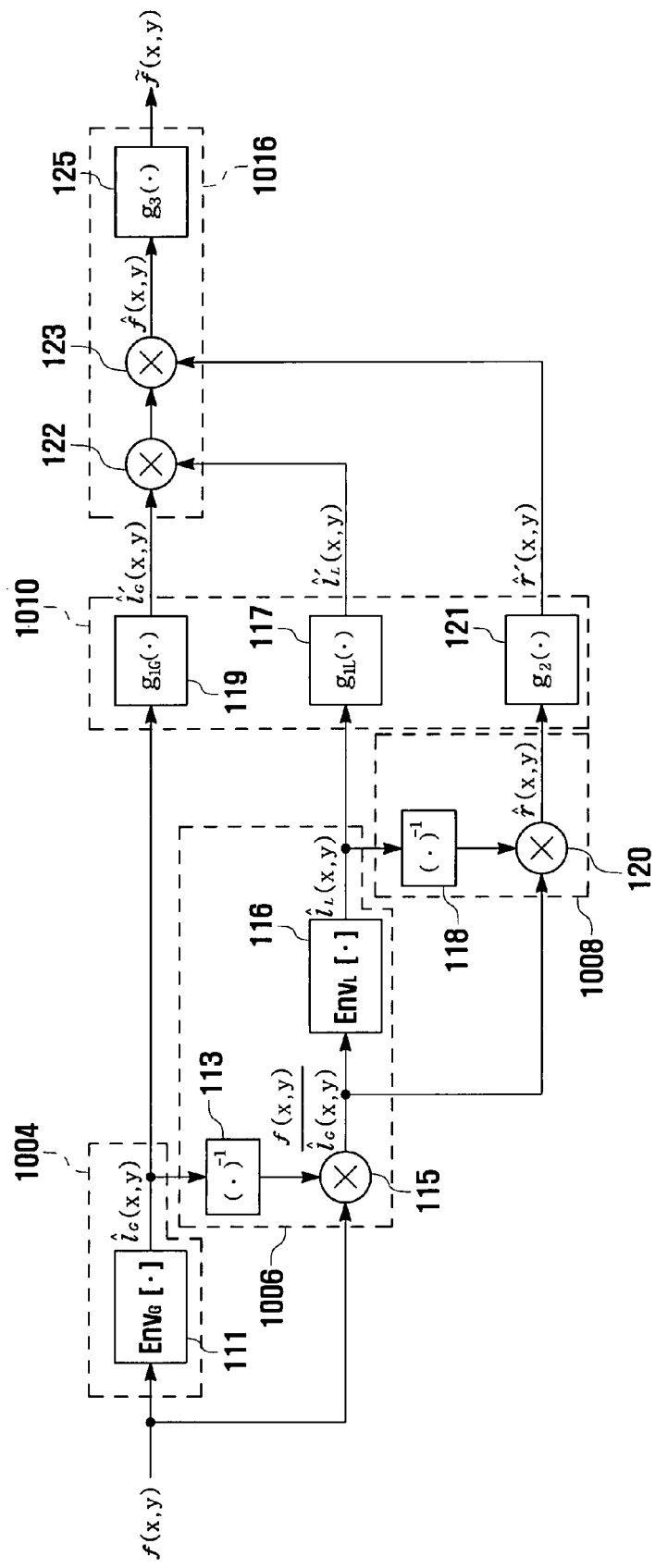
FIG. 10 is a block diagram illustrating a configuration of a black and white image enhancement system according to an exemplary embodiment of the present invention.

FIG. 10 is a block diagram illustrating an image enhancement system according to another exemplary embodiment of the present invention. In this embodiment, a black and white image enhancement system is proposed.

Referring to FIG. 10, the image enhancement system includes a global illumination estimator 1004, a local illumination estimator 1006, a reflectance estimator 1008, an illumination/reflectance enhancer 1010, and an image formatting and enhanced component output unit 1016.

The global illumination estimator 1004 is implemented with the first envelope detector 111 for estimating the global illumination $l_G(x,y)$ by envelope detection through an AM demodulation on the input image.

The local illumination estimator 1006 includes the first inverter 113 for inverting the estimated global illumination $\hat{l}_G(x,y)$ output from the first envelope detector 111, the first multiplier 115 for multiplying the output of the first inverter 113 and the input image $f(x,y)$, and the second envelope detector 116 for estimating the local illumination $l_L(x,y)$ by envelope detection through an AM modulation on the output of the first multiplier 115.

The reflectance estimator 1008 includes the second inverter 118 for inverting the output of the second envelope detector 116 and a second multiplier 120 for estimating the reflectance $r(x,y)$ by multiplying the output of the second inverter 118 and the output of the first multiplier 115.

The illumination/reflectance enhancer 1010 includes the first and second correctors 119 and 117 for decreasing dynamic ranges of the global and local illuminations, respectively, estimated by the global illumination estimator 1004 and the local illumination estimator 1006, and a third corrector 121 for increasing the reflectance estimated by the reflectance estimator 1008.

The image format and enhanced component output unit 1016 includes a third multiplier 122 for multiplying the outputs of the first and second correctors 119 and 117 of the illumination/reflectance enhancer 1010, a fourth multiplier 123 for multiplying the output of the third multiplier 122 and the output of the third corrector 121, and a fourth corrector 125 for formatting the output of the fourth multiplier 123 so as to produce an enhanced output image.

The fourth corrector 125 corrects a brightness value range of the output of fourth multiplier 123 suitable for the brightness value range of an output device.

With regard to a black and white image, the input image $f(x,y)$ can be formatted as the product of the global illumination $l_G(x,y)$, the local illumination $l_L(x,y)$, and the reflectance $r(x,y)$ as equation 22.

$$f(x,y)=l_G(x,y) \cdot l_G(x,y) \cdot r(x,y) \quad (22)$$

Assuming that the global illumination is distributed in the lowest frequency band, and the reflectance is distributed in the highest frequency band, the image enhancement scheme, to the generalized image enhancement of equation 20 obtained from the conventional image formation model, can be expressed as equation 23:

$$\hat{f}(x,y)=g_{1G}(\hat{l}_G(x,y)) \cdot g_{1L}(\hat{l}_L(x,y)) \cdot g_2(\hat{r}(x,y)) \quad (23)$$

where $\hat{l}_G(x,y)$ is the estimated global illumination, $\hat{l}_L(x,y)$ is the estimated local illumination, and $\hat{r}(x,y)$ is the estimated reflectance. $g_{1G}(\bullet)$ and $g_{1L}(\bullet)$ are functions for decreasing the dynamic ranges of the estimated global illumination $\hat{l}_G(x,y)$ and the estimated local illumination $\hat{l}_L(x,y)$, and $g_2(\bullet)$ is a function for increasing the contrast of the estimated reflectance $\hat{r}(x,y)$. Typically, $g_{1G}(\bullet)$, $g_{1L}(\bullet)$, and $g_2(\bullet)$ are power functions. However, the power functions can be replaced by log functions. $\tilde{f}(x,y)$ is an output image and is processed to adjust its brightness range to that of the output device, using the fourth corrector 125 represented by $g_3(\bullet)$ as in equation 21, such that a final output image $\tilde{f}(x,y)$ is obtained.

Assuming that a bias is added to the global illumination $l_G(x,y)$ and the local illumination $l_L(x,y)$ in equation 22, the global illumination $l_G(x,y)$ and the local illumination $l_L(x,y)$ are estimated from the input image $f(x,y)$ by the first and second envelope detectors 111 and 116 as equations (24) and (25). The reflectance $r(x,y)$ is estimated as equation (26). In equation (24):

$$\hat{l}_G(x,y)=Env_G[f(x,y)] \quad (24)$$

$\hat{l}_G(x,y)$ is the estimated global illumination, $Env_G[\bullet]$ represents the first envelope detector 111 used for estimating the global illumination. From equation 24, it is noted that the image obtained by removing the global illumination $l_G(x,y)$ from the input image $f(x,y)$ is equivalent to the image obtained by AM-modulating the local illumination $l_L(x,y)$ using the reflectance $r(x,y)$. The local illumination $l_L(x,y)$ is estimated by applying the envelope detector 116 to an image obtained by dividing the input image $f(x,y)$ with the estimated global illumination $\hat{l}_G(x,y)$ as in equation (25):

$$\hat{l}_L(x, y) = Env_L\left[\frac{f(x, y)}{\hat{l}_G(x, y)}\right] \quad (25)$$

where $\hat{l}_L(x,y)$ is the estimated local illumination, $Env_L[\bullet]$ represents the second envelope detector 116 used for estimating the local illumination. The reflectance $r(x,y)$ can be estimated by dividing the input image $f(x,y)$ with the estimated global illumination $\hat{l}_G(x,y)$ and the estimated local illumination $\hat{l}_L(x,y)$ as in equation (26).

$$\hat{r}(x, y) = \frac{f(x, y)}{\hat{l}_G(x, y) \cdot \hat{l}_L(x, y)} \quad (26)$$

In FIG. 10, the functions $g_{1G}(\bullet)$ and $g_{1L}(\bullet)$ decrease the dynamic ranges of the estimated global illumination $\hat{l}_G(x,y)$ and the estimated local illumination $\hat{l}_L(x,y)$ as the first and second correctors 119 and 117, respectively. $g_2(\bullet)$ of the third corrector 121 increases the contrast of the estimated reflectance $\hat{r}(x,y)$. The outputs of the first and second correctors 119 and 117 are multiplied by the third multiplier 122, and the output of the third multiplier and the output of the third corrector 121 are multiplied such that the output image $\tilde{f}(x,y)$ is produced. $g_3(\bullet)$ is a function used in the fourth corrector 125 for adjusting the brightness range of the output image $\tilde{f}(x,y)$ to that of the output device. The fourth corrector 125 uses a histogram modeling. However, the histogram modeling can be replaced by a histogram stretching.

Figure 11A:
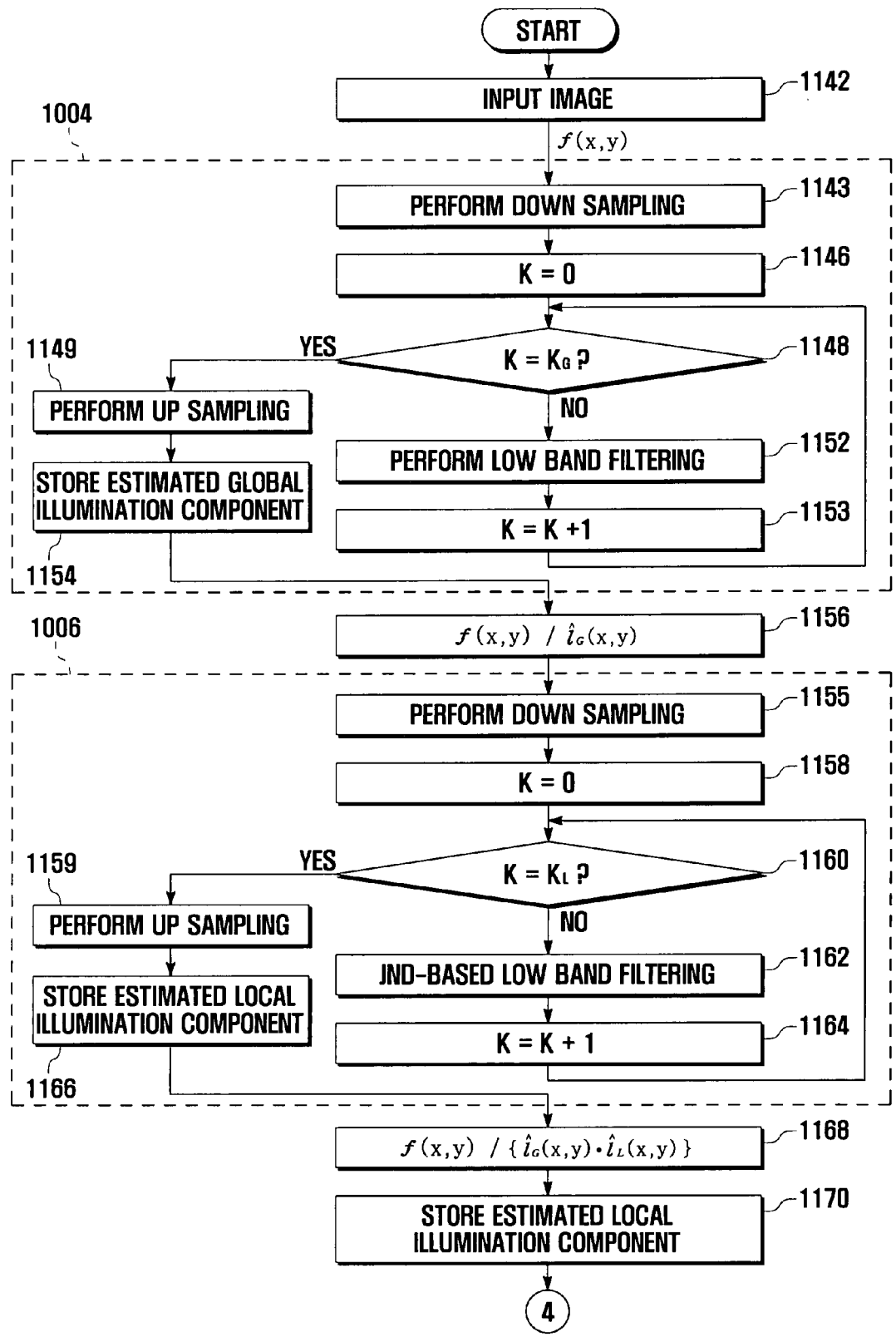
FIGS. 11A and 11B are flowcharts illustrating a black and white image enhancement method according to an exemplary embodiment of the present invention.
Figure 11B:
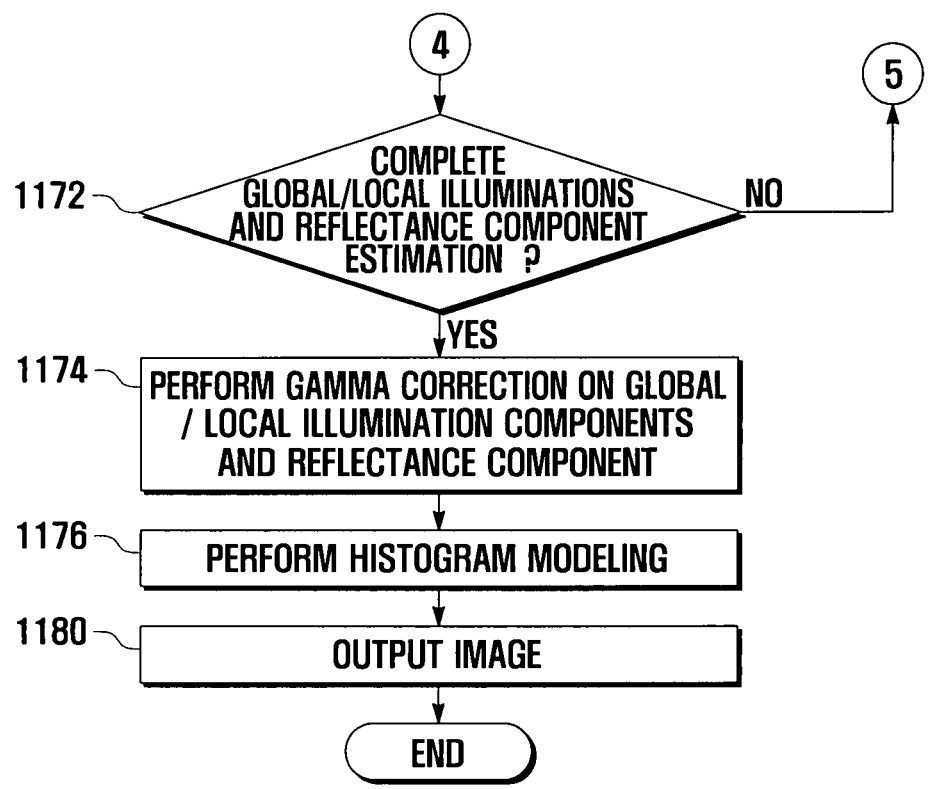

FIGS. 11A and 11B are flowcharts illustrating an image enhancement method according to an exemplary embodiment of the present invention. In this exemplary embodiment, the image enhancement method is proposed in relation with the black and white image enhancement system of FIG. 10. How to estimate the global/local illuminations and the reflectance for improving the quality of the black and white image is described hereinafter in more detail.

Estimation of Global Illumination

As an envelope detector 111 of equation 28 for estimating the global illumination, a linear low-pass filtering having wide support region can be used. The estimation of the global illumination on the input image f(x,y) using the linear LPF is expressed by equation (27):

$$\hat{l}_G(x, y) = LPF_G[f(x, y)] \qquad (27)$$
$$= \sum_{(m,n) \in W_2} h(m, n) f(x - m, y - n)$$

where h(m,n) is the linear LPF, and $W_2$ is a 2-dimensional filter window.

In order to perform fast linear low-pass filtering, a Gaussian Pyramid filtering, which repeats filtering with increasing of the support region of the filter, is used in this exemplary embodiment.

The support region is increased twice by widening a gap between filter taps twice without changing the filter coefficients. Whenever the number of filtering increases, the filtering is performed with wider support region. For faster filtering, a 1-dimensional linear LPF is horizontally applied to an image and then vertically applied to the result image. Such filtering can be expressed by equation 28:

$$f^k(x, y) = \sum_{m \in W_1} \sum_{n \in W_1} h(m) h(n) f^{k-1}(x - 2^{k-1}m, y - 2^{k-1}n), \qquad (28)$$
$$k = 1, 2, \ldots, K_G$$

where $f^k(x,y)$ is an image input to the envelope detector 111 and $W_1$ is a 1-dimentional filter window.

If an image is input to the envelope detector 111 (S1142), the input image is down sampled (S1143). If the input image is the first one for estimating the global illumination, k is initialized to be set to 0 (S1146). At step S1146, $K_G$ is the repetition number of filtering operations for estimating the global illumination. Here, $f^0(x,y)=f(x,y)$ and $f^{K_G}(x,y)=\hat{l}_G(x,y)$.

In this exemplary embodiment, the repetition number of filtering $K_G$ of the input image having a size of M×N is decided by equation (29) based on simulation results which have shown that the best performance is obtained when the maximum support region of the filter is ¼ of the 1-dimensional size of the input image. In equation (29):

$$K_G = \begin{cases} E - 1, & E \geq 3 \\ 1, & \text{otherwise} \end{cases} \qquad (29)$$

E is a constant determined by equation (30) in consideration of the twice increase of the support region of the filter whenever increasing the number of filtering.

$$E = \log_2 \max(M, N) \qquad (30)$$

Figure 12A:
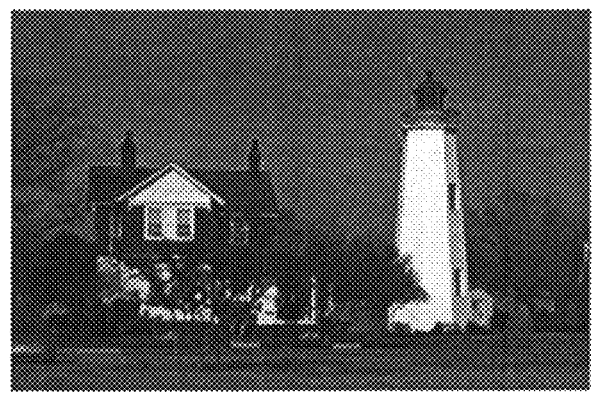
FIGS. 12A and 12B illustrate an input image and global illumination estimated through the procedure of FIGS. 11A and 11B.
Figure 12B:
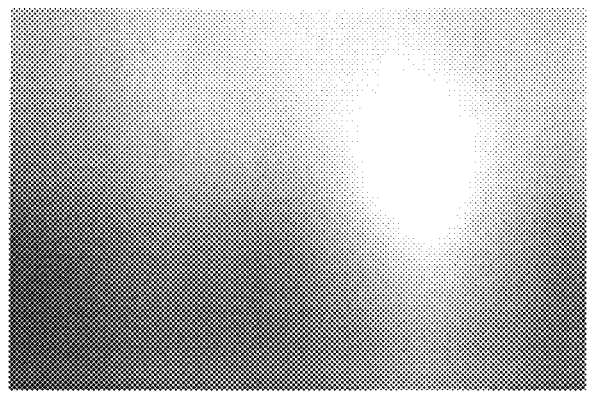

The step S1146 is a process for initializing a variable k indicating a number of filtering iterations for estimating the global illumination. The step S1148 is a process for determining whether the number of filtering iterations reaches a repetition number $K_G$ of filtering operations. If a current number of filtering iterations is not equal to the repetition number $K_G$, low-pass filtering is performed in step S1152 and the number of filtering increases by 1 (k=k+1) in step S1153. After the low-pass filtering is performed, the increased number of filtering is compared with the repetition number $K_G$ in step S1148. If k is equal to $K_G$ at step S1148, the down sampled image is up sampled so as to be restored its original size in step S1149, and the estimated global illumination is stored in step S1154. FIGS. 12A and 12B are exemplary images before and after applying a linear low passing filter of an image enhancement system according to an exemplary embodiment of the present invention. The input image (FIG. 12A) having a size of 2000×1312 is filtered by a linear LPF having filter coefficients of h(m)=h(n)=[0.25,0.5,0.25],m,n=−1,0,1 FIG. 12B illustrates the global illumination estimated with the repetition number 9 ($K_G$=9). As shown in FIG. 12B, the global illumination varies gradually over the entire area including edges.

Estimation of Local Illumination and Reflectance

After estimating the global illumination, the local illumination is estimated by removing the estimated global illumination from the input image. In order to remove the estimated global illumination, it is inverted by the first inverter 113 and then is multiplied with the input image at the first multiplier 115 in step S1156. Accordingly, an intermediate image is obtained by removing the estimated global illumination from the input image. The intermediate image is down sampled in step S1155. The estimation of local illumination is performed through steps S1158 to S1166. In step S1158, k is initialized to be set to 0. k is a counter for indicating the number of filtering iterations for estimating the local illumination. The linear low-pass filtering is repeated to $K_L$ in step S1160. If the current number of filter iterations is not equal to the repetition number $K_L$, a just noticeable difference (JND)-based low-pass filtering is performed in step S1162 and the number of filtering increases by 1 (k=k+1) in step S1164. The JND-based nonlinear low-pass filtering is used for estimating the local illumination in a minimum local brightness difference even with the irregular image variation. The minimum local brightness difference of the local variation is obtained on the basis of Weber's law as equation (31):

$$JND(I) = \mu + \sigma \cdot I \qquad (31)$$

where I is a uniform brightness value of image, JND(I) is the JND value to I, and μ and σ are constants. Using JND value, it is possible to obtain the minimum brightness difference JND(f(x,y)) of a brightness f(x,y) at a specific image pixel (x,y) which the HVS can perceive. That is the reason why the minimum brightness difference is used is for restraining the halo effect. For example, a pixel of which brightness difference with that of the center pixel of the filter window is greater than JND is excluded in the filtering, and a pixel of which brightness difference is less than JND is filtered with a linear LPF, which performs filtering by adjusting its filter coefficient according to the brightness difference level. In this exemplary embodiment, in order to express the JND-based nonlinear LPF, an image obtained by removing the estimated global illumination $\hat{l}_G(x,y)$ from the input image f(x,y) is expressed by $f_1(x,y)$, for simplifying the explanation, as following equation (32).

$$f_1(x, y) = \frac{f(x, y)}{\hat{l}_G(x, y)} \qquad (32)$$

A ratio of the difference if $|f_1(x,y) - f_1(x-m, y-n)|$ between the brightness of a center pixel (x,y) and the brightness of a pixel distant away as much as (m,n) from the center pixel, to the JND value JND($f_1(x,y)$) of the center pixel (x,y) can be expressed by J(x,y;m,n) as equation 33.

$$J(x, y; m, n) = \frac{|f_1(x, y) - f_1(x - m, y - n)|}{JND(f_1(x, y))} \quad (33)$$

A weighting function λ(x,y;m,n) for adjusting the coefficients of the filter according to the ratio J(x,y;m,n) of equation (33) can be defined as following equation:

$$\lambda(x, y; m, n) = \begin{cases} 0, & \text{if } J(x, y; m, n) > 1 \\ \exp\left[-\frac{J(x, y; m, n) - Th}{1 - Th}\right], & \text{if } Th \leq J(x, y; m, n) \leq 1 \\ 1, & \text{if } J(x, y; m, n) < Th \end{cases} \quad (34)$$

where Th is a threshold. The estimation of the local illumination using the linear LPF adopting the weighting function λ(x,y;m,n) of equation (34) is expressed as equations (35) and (36).

$$\hat{l}_L(x, y) = LPF_L[f_1(x, y)] \quad (35)$$
$$= \frac{1}{\Lambda(x, y)} \sum_{(m,n) \in W_2} h(m, n) \lambda(x, y; m, n) f_1(x - m, y - n)$$

$$\Lambda(x, y) = \sum_{(m,n) \in W_2} h(m, n) \lambda(x, y; m, n) \quad (36)$$

Through equations (31) to (36), in the case that J(x,y;m,n) is greater than 1, the pixel is regarded as a pixel of which brightness difference with the center pixel can be detected, whereby the pixel is not used for filtering the center pixel (x,y).

In a case that J(x,y;m,n) is less than Th, the pixel is regarded as a pixel of which brightness is little different from that of the center pixel, whereby the pixel is used for filtering the center pixel (x,y) with the original filter coefficient. If Th≤J(x,y;m,n)≤1, the pixel is used for filtering the center pixel with a filter coefficient of which value is decreased from the original filter coefficient, as J(x,y;m,n) closes to 1.

Accordingly, a pixel of which brightness difference with the center pixel is greater than or equal to JND multiplied by Th uses a nonlinear LPF adjusting the filter coefficient in this embodiment. For performing a nonlinear low-pass filtering, a 1 dimensional filter is applied in horizontal and vertical directions in alternate fashion as in equations (37) and (38):

$$f_1^K(x, y) = \frac{1}{\Lambda(x)\Lambda(y)} \quad (37)$$
$$\sum_{m \in W_1} \sum_{n \in W_1} h(m) h(n) \lambda(x; m) \lambda(y; n) f_1^{k-1}(x - 2^{k-1}m, y - 2^{k-1}n),$$

$$\Lambda(x) = \sum_{m \in W_1} h(m) \lambda(x; m) \quad (38)$$

where $K_L$ is the repetition number of filtering operations, λ(x;m) is a 1-dimensional signal of equation 34, Λ(y) is defined by equation (38). At this time $f_1^0(x,y)=f_1(x,y)$ and $f_1^{K_L}(x,y)=l_L(x,y)$.

After increasing the number of filtering operations, the increased number of filtering is compared with the repetition number $K_L$ at step S1160.

If k is equal to $K_L$ at step S1160, the filtering operation is completed such that the down sampled image is up sampled so as to be restored its original size in step S1159, and the estimated local illumination is stored in step S1166.

In the case that the envelope detector 116 is implemented with JND-based nonlinear LPF, it shows best performance when the maximum support region of the filter is 1/64 of the 1-dimensional size of the intermediate image. On the basis of the simulation results, the repetition number $K_L$ of filtering operations to the input image of M×N size is determined as equation 39:

$$K_L = \begin{cases} E - 5, & E \geq 7 \\ 1, & \text{otherwise} \end{cases} \quad (39)$$

where E is a constant determined by equation (30). The halo effect in an output image obtained from an input image having strong edges can be restrained by the nonlinear low-pass filtering with the adjustment of the coefficients of the filter using JND.

Figure 13A:
FIGS. 13A and 13B illustrate local illumination and reflectance estimated from the input image of FIG. 12A.
Figure 13B:
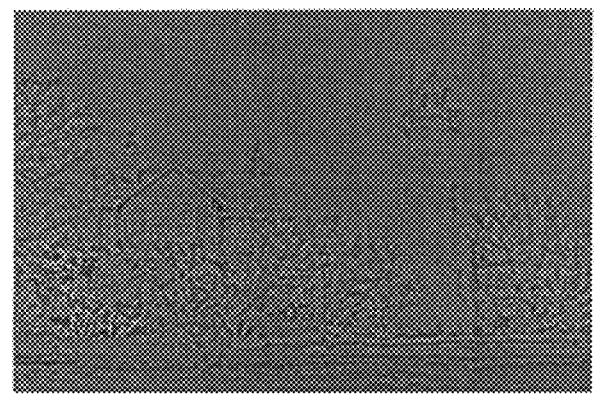

If there is little possibility of the occurrence of halo effect due to no storing edge of the input image so that the filtering is implemented without JND, the weighting function is set to 1. FIG. 13A illustrates a local illumination estimated from the input image of FIG. 12A with the repetition number of 5 ($K_L$=5). Here, the input image is filtered by a nonlinear LPF of which coefficients are h(m)=h(n)=[0.25,0.5,0.25],m,n=−1,0, 1. FIG. 13B illustrates the reflectance estimated from the input image of FIG. 12a. The constant for JND of equation (31) is set to μ=4 and σ=0.12301 as disclosed by S. A. Rajala, M. R. Civanlar, and W. M. Lee in "A Second Generation Image Coding Technique Using Human Visual System Based Segmentation," in Proc. IEEE Int. Conf. Acoustics, Speech, Signal Processing, vol. 12, Dallas, Tex., April 1987, pp. 1362-1365," and the value of the threshold Th is experimentally set to 0.8.

As illustrated in local illumination of FIG. 13A, an area such as edge showing abrupt variation maintains the difference of brightness value, while an area such as sky and roof shows little variation in brightness value. Finally, the reflectance r(x,y) in equation 26 is estimated at step S1168 and then stored at step S1170. The step S1172 is a process for determining whether the estimation of the global and local illuminations and reflectance is completed, and the step S1174 is a process for performing gamma corrections on the estimated global and local illuminations and reflectance. The gamma correction are decreasing the dynamic range of the estimated global and local illuminations and increasing the contrast of the reflectance. Step S1176 is a process for processing the histogram modeling, and step S1180 is a process for generating an output image.

Color Image Enhancement Method

In an exemplary embodiment, it is assumed that the illumination is white-light. Under the assumption, the illuminations of R, G, and B have the same value, so the illumination $l_i(x,y), i \in \{R,G,B\}$ of equation 18 can be expressed by l(x,y). Accordingly, when the illumination is the white light, equation (15) can be replaced with equation (40).

$$f_i(x,y) = l(x,y) \cdot r_i(x,y), i \in \{R,G,B\} \quad (40)$$

If converting the RGB color image represented by equation (40) into HSV color image using a RGB/HSV color conversion relationship as proposed by R. W. G. Hunt in "Measuring Color," New York, Halsted Press, 1989, the respective component images $f_i(x,y), i \in \{R,G,B\}$ can be expressed by equations (41), (42), and (43).

$$f_H(x,y) = r_H(x,y) \tag{41}$$

$$f_S(x,y) = r_S(x,y) \tag{42}$$

$$f_V(x,y) = l(x,y) \cdot r_V(x,y) \tag{43}$$

As in equations (41), (42), and (43), it is known that the H and S component images are not related with the illumination, and only the V component image is affected by the illumination.

Accordingly, by maintaining the H and S component images of the input color image and improving only the V component image, it is possible to obtain the output color image in which the affection of the illumination is compensated. If the image enhancement is performed in this manner, it is possible to avoid the gray-world violation in the output color image because the hue and saturation are not changed.

Figure 14:
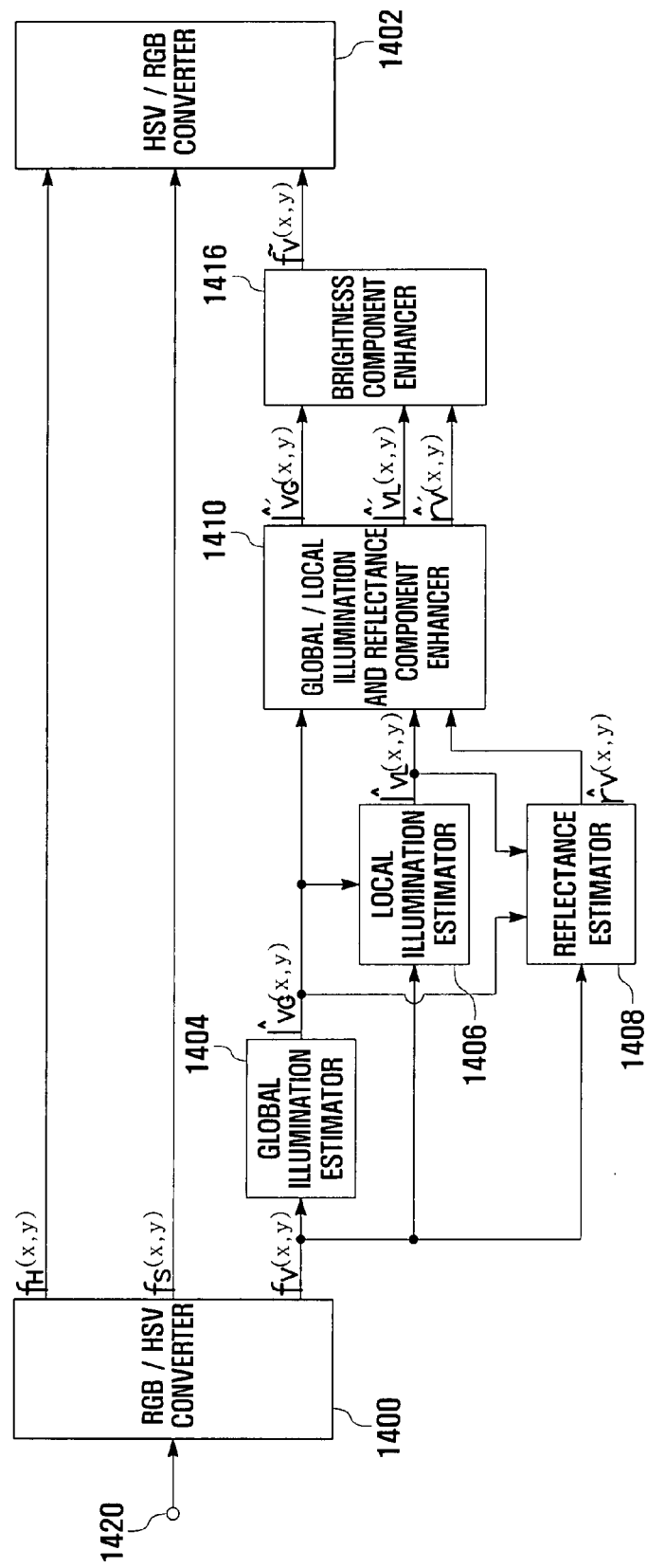
FIG. 14 is a block diagram illustrating a configuration of a color image enhancement system according to an exemplary embodiment of the present invention.

FIG. 14 is a block diagram illustrating a color image enhancement system according to an exemplary embodiment of the present invention.

Referring to FIG. 14, an image enhancement system includes an RGB/HSV converter 1400 for converting RGB of an input image into HSV, a global illumination estimator 1404 for estimating the global illumination from the V component, a local illumination estimator 1406 for estimating the local illumination from an output of the global illumination estimator 1404 and the V component output from the RGB/HSV converter 1400, a reflectance estimator 1408 for estimating a reflectance from the V component image output from the RGB/HSV converter 1400, an output of the global illumination estimator 1404, and the output of the local illumination estimator 1406, a global/local illumination and reflectance enhancer 1410 performing a gamma correction for decreasing dynamic ranges of the global and local illuminations estimated by the global and local illumination estimators 1404 and 1406, and performing gamma correction for increasing a contrast of the reflectance estimated by the reflectance estimator 1408, a V component image enhancer 1416 for multiplying the outputs from the global/local illumination and reflectance enhancer 1410 such that the brightness range of the V component image is adjust to that of an output device and a HSV/RGB converter 1402 for converting the H and V component images output from the RGB/HSV converter 1400 and the V component image output from the V component image enhancer 1416 into RGB component images.

In an exemplary embodiment, the input RGB color image is converted into an HSV color image and then a V component image is enhanced on the basis of the advanced image formation model under the assumption of white-light illumination environment. The global illumination is estimated using a linear LPF having a wide support region from the V component image at the global illumination estimator 1404, and the local illumination is estimated using a JND-based nonlinear LPF having a narrow support region from an image obtained by removing the global illumination from the V component image at the local illumination estimator 1406. The reflectance is estimated by dividing the V component image with the estimated global and local illuminations at the reflectance estimator 1408. The estimated components are gamma corrected at the global/local illumination and reflectance enhancer 1410 and then the enhanced components are processed at the V component image enhancer 1416 such that an enhanced V component image is produced. The gamma correction is applied in decrementing strengths, i.e. global illumination>local illumination>reflectance. In order for the brightness range of the output V component image to be adjusted to that of an output device, the histogram modeling is applied such that the final output V component image is obtained.

Finally, using the final output V component image and the input H and S component images, the HSV/RGB converter 1402 produces an output RGB color image.

Figure 15:
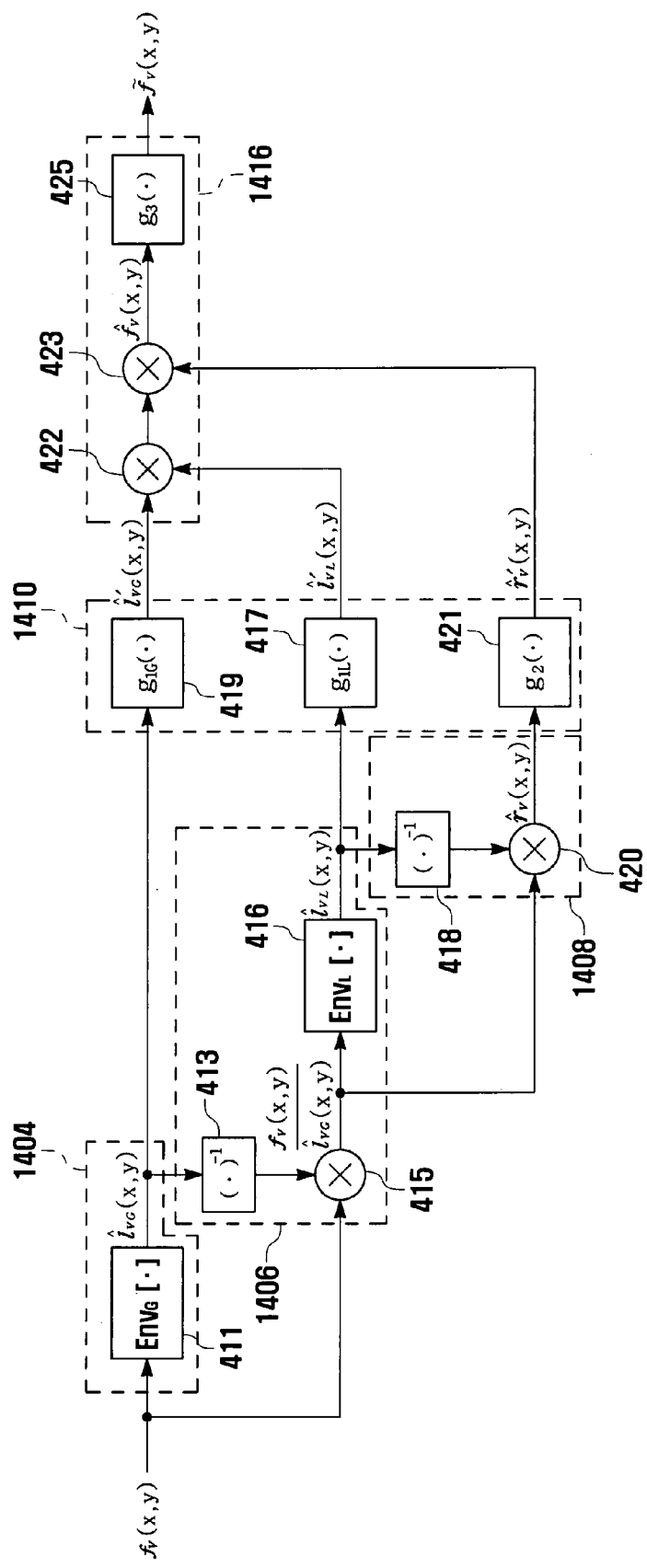
FIG. 15 is a block diagram illustrating a detailed configuration of a color image enhancement system of FIG. 14.
Figure 16A:
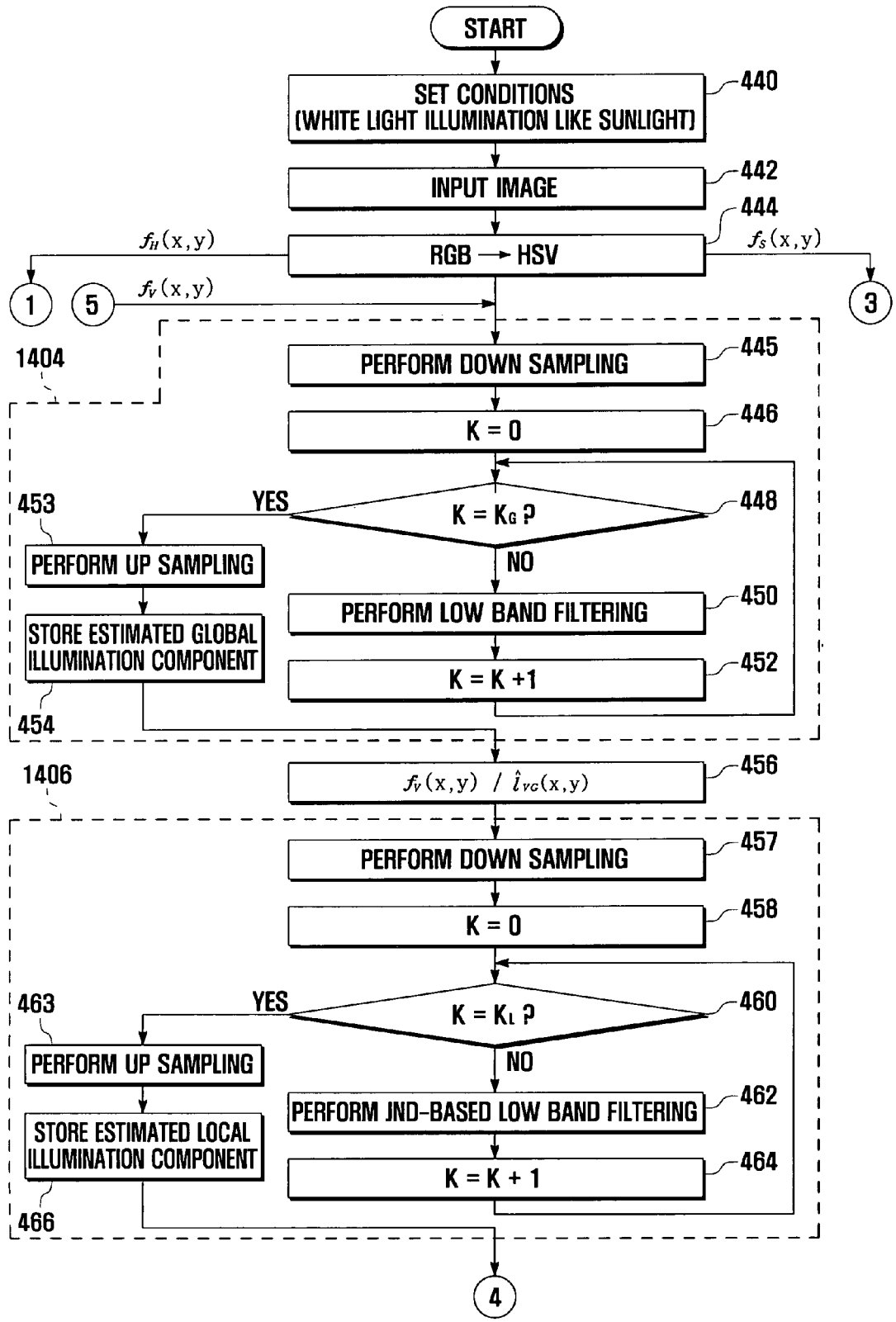
FIGS. 16A and 16B are flowcharts illustrating a color image enhancement method according to an exemplary embodiment of the present invention.
Figure 16B:
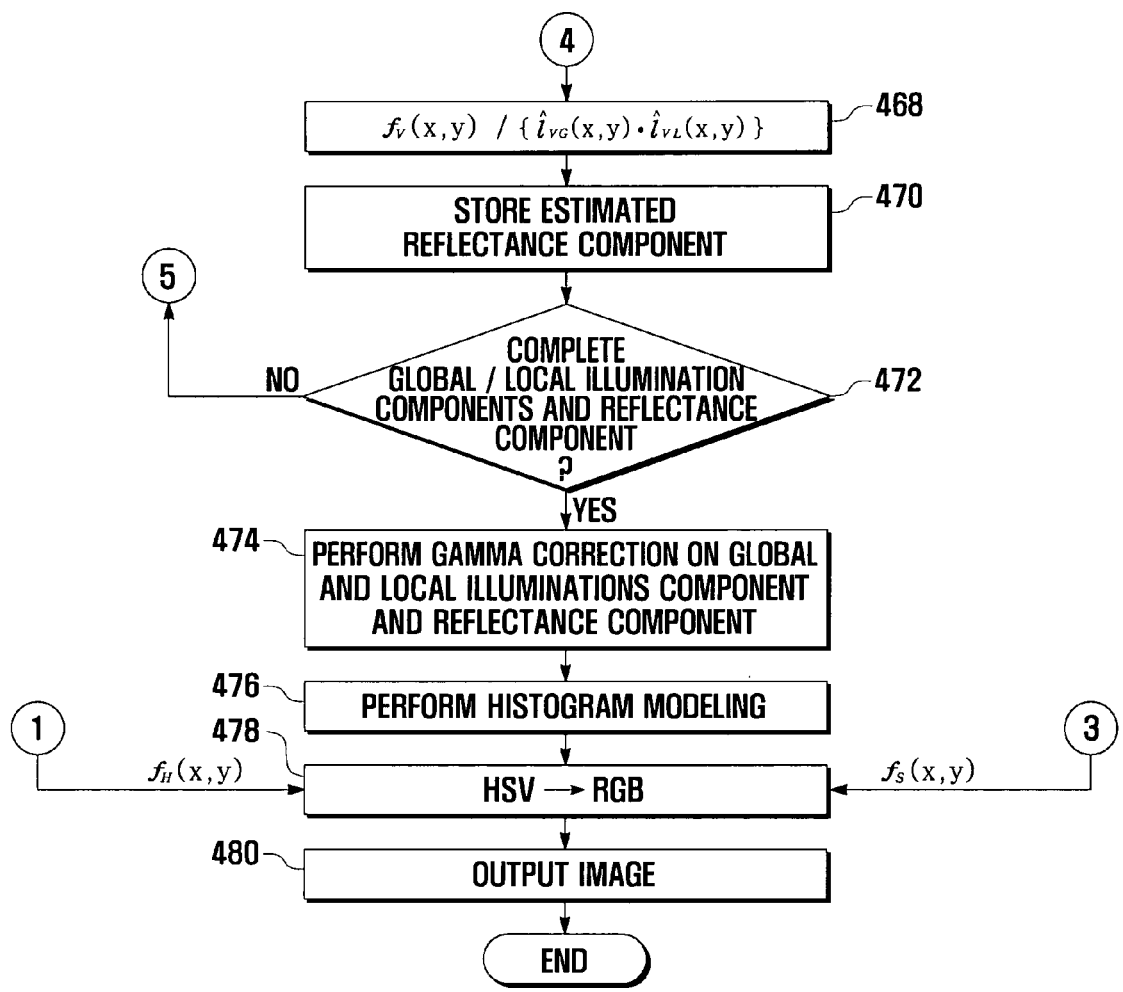

FIG. 15 is a block diagram illustrating a configuration of an exemplary image enhancement system of FIG. 14. FIGS. 16A and 16B are flowcharts for illustrating an operation of the image enhancement system of FIG. 14.

An image enhancement operation is described in association with the estimation of the global and local illumination and reflectance with reference to FIGS. 14 to 16.

In FIG. 16A, it is assumed that the illumination is white-light in the color space as an initial condition in step S440. If an R, G, and B color image is input in step S442, the RGB/HSV converter 1400 converts the RGB color image into an H, S, and V color image in step S444.

From the input V component image $f_V(x,y)$ as an output of the RGB/HSV converter 1400, an envelope detector 411 of the global illumination estimator 1404 estimates the global illumination $l_{VG}(x,y)$ representing a global brightness variation. The estimated global illumination $\hat{l}_{VG}(x,y)$ is inverted by an inverter 413, and the output of the inverter 413 is multiplied with the input V component image $f_V(x,y)$ by a multiplier 415 such that the global illumination is estimated. The local illumination $l_{VG}(x,y)$ representing the local brightness variation is estimated from an image obtained by removing the estimated global illumination from the input V component image $f_V(x,y)$ at an envelope detector 416. A reflectance $r_V(x,y)$ is estimated by multiplying a value obtained by inverting, at an inverter 418, the estimated local illumination $\hat{l}_{VL}(x,y)$ with the output of the multiplier 415, at another multiplier 420. The output of the envelope detectors 411 and 416 processed by correctors 419 and 417 such that their dynamic ranges are decreased. The outputs of the correctors 419 and 417 are multiplied with each other at a multiplier 422. The estimated reflectance output from the multiplier 420 is processed by a corrector 421 such that its contrast is increased. The output of the corrector 421 is multiplied with the output of the multiplier 422 so as to be output as a formatted image. The brightness range of the output of the multiplier 423 is adjusted to that of an output device by a histogram modeling unit 425 such that a final output V component image is output. In the image formation model of this exemplary embodiment, the input V component image $f_V(x,y)$ is expressed as a multiplication of the global illumination $l_{VG}(x,y)$ the local illumination $l_{VL}(x,y)$, and the reflectance $r_V(x,y)$ as equation 44.

$$f_V(x,y) = l_{VG}(x,y) \cdot l_{VL}(x,y) \cdot r_V(x,y) \tag{44}$$

Assuming that the global illumination estimated by the global illumination estimator 1404 is distributed in the lowest frequency band, and the reflectance estimated by the reflectance estimator 1408 is distributed in the highest frequency band, the image enhancement of equation (15) based on the advanced image formation model of equation 22 can be expressed by equation (45):

$$\hat{f}_V(x,y) = g_{1G}(\hat{l}_{VG}(x,y)) \cdot g_{1L}(\hat{l}_{VL}(x,y)) \cdot g_2(\hat{r}_V(x,y)) \tag{45}$$

where $\hat{l}_{VG}(x,y)$ is the estimated global illumination of the V component image, $\hat{l}_{VL}(x,y)$ is the estimated local illumination of the estimated V component image, and $\hat{r}_V(x,y)$ is the estimated reflectance of the V component image. $g_{1G}(\bullet)$ and $g_{1L}(\bullet)$ are functions for decreasing the dynamic ranges of the estimated global and local illuminations $\hat{l}_{VG}(x,t)$ and $\hat{l}_{VL}(x,y)$ estimated by the correctors 419 and 417, respectively, and $g_2(\bullet)$ is a function for increasing the contrast of the estimated reflectance $\hat{r}_V(x,y)$ estimated by the gamma corrector 421. The functions $g_{1G}(\bullet)$, $g_{1L}(\bullet)$, and $g_2(\bullet)$ use power functions for gamma corrections and they can be replaced by log functions. The brightness range of the output V component image $\hat{f}_V(x,y)$ is adjusted to that of the output device using the histogram modeling unit 425 of $g_3(\bullet)$ as equation (21) such that the enhanced V component image $\tilde{f}_V(x,y)$ is obtained.

Assuming that the global illumination $l_{VG}(x,y)$ and local illumination $l_{VL}(x,y)$ are added by respective biases, the input V component image $f_V(x,y)$ can be regarded that the global illumination $l_{VG}(x,y)$ is AM modulated by the local illumination $l_{VL}(x,y)$ and the reflectance $r_V(x,y)$. In this case, the global illumination can be estimated by applying an envelope detector to the input V component image $f_V(x,y)$ as equation 46:

$$\hat{l}_{VG}(x,y) = Env_G[f_V(x,y)] \qquad (46)$$

where $\hat{l}_{VG}(x,y)$ is the estimated global illumination of the V component image, $Env_G[\bullet]$ is the envelope detector 411 used for estimating the global illumination. On the basis of equation (26), the image obtained by removing the global illumination $l_{VG}(x,y)$ from the input V component image $f_V(x,y)$ can be regarded that the local illumination $l_{VL}(x,y)$ is AM modulated by the reflectance $r_V(x,y)$. The local illumination $l_{VG}(x,y)$ is estimated by applying the envelope detector 416 to the image obtained by removing the estimated global illumination $\hat{l}_{VG}(x,y)$ from the input V component image $f_V(x,y)$ as equation 47:

$$\hat{l}_{VL}(x,y) = Env_L\left[\frac{f_V(x,y)}{\hat{l}_{VG}(x,y)}\right] \qquad (47)$$

where $\hat{l}_{VL}(x,y)$ is the estimated local illumination, and $Env_L[\bullet]$ is the envelope detector 416 used for estimating the local illumination. The reflectance $r(x,y)$ is estimated by dividing the input V component image $f_V(x,y)$ by a multiplication of the estimated global illumination $\hat{l}_{VG}(x,y)$ and the estimated local illumination $\hat{l}_{VL}(x,y)$ as equation (48).

$$\hat{r}_V(x,y) = \frac{f_V(x,y)}{\hat{l}_{VG}(x,y) \cdot \hat{l}_{VL}(x,y)} \qquad (48)$$

The estimated global and local illuminations $\hat{l}_{VG}(x,y)$ and $\hat{l}_{VL}(x,y)$ estimated from the input V component image $f_V(x,y)$ are gamma corrected by the respective correctors 419 and 417 with functions $g_{1G}(\bullet)$ and $g_{1L}(\bullet)$ such that their dynamic ranges are decreased. The corrector 421 increases the contrast of the estimated reflectance $\hat{r}_V(x,y)$ with the function $g_2(\bullet)$. The outputs of the correctors 419 and 417 are multiplied by the multiplier 422, and the output of the multiplier 422 and the output of the corrector 421 are multiplied by the multiplier 423 so as to be formatted as the output V component image $\hat{f}_V(x,y)$. The function $g_3(\bullet)$ of corrector 425 adjusts the output image $\tilde{f}_V(x,y)$ to that of an output device.

Estimation of Global Illumination of V Component Image

The $f_V(x,y)$, which is an output of the RGB/HSV converter 1400, is input to the global illumination estimator 1404. The global illumination estimator 1404 estimates the global illumination $l_{VG}(x,y)$ of the V component image by envelope detection of the AM modulated V component image using the envelop filter 411. The envelope detector 411 of equation (46) used for the estimation of the global illumination can be implemented with a linear LPF having wide support region. The estimation of the global illumination $l_{VG}(x,y)$ can be expressed by equation (49).

$$\hat{l}_{VG}(x,y) = LPF_G[f_V(x,y)] \qquad (49)$$
$$= \sum_{(m,n) \in W_2} h(m,n) f_V(x-m, y-n)$$

where $h(m,n)$ is a linear LPF, $W_2$ is a 2-dimensional filter window.

In an exemplary embodiment, for fast linear low-pass filtering, a Gaussian pyramid filtering is performed repeatedly with increasing of the support region of the filter. Initially, the filtering is performed with narrow support region to the input image, and then filtering is repeated to the image after setting the gaps between the filter taps twice as wide without changing the filter coefficients. For fast filtering, a 1-dimensional linear LPF is horizontally applied to an image and then vertically applied to the resulting image. Such filtering operation can be expressed by equation (50):

$$f_V^k(x,y) = \sum_{m \in W_1} \sum_{n \in W_1} h(m)h(n) f_V^{k-1}(x - 2^{k-1}m, y - 2^{k-1}n), \qquad (50)$$
$$k = 1, 2, \ldots, K_G$$

where $f_V^k(x,y)$ is an input V component image obtained by $k^{th}$ linear low-pass filtering, and $h(m)$ and $h(n)$ are 1-dimensional linear LPF applied in horizontal and vertical directions. $W_1$ is a 1-dimensional filter window, and $K_G$ is the repetition number of filtering operations. Here, $f_V^0(x,y) = f_V(x,y)$ and $f_V^{K_G}(x,y) = \hat{l}_{VG}(x,y)$.

If an image is input to the envelope detector, the input V component image is down sampled in step S445.

In an exemplary embodiment, the repetition number $K_G$ of filtering operations is determined by equation (51) on the basis of simulation results which have shown that the best performance is obtained when the maximum support region of the filter is ¼ of the 1-dimensional size of the input image:

$$K_L = \begin{cases} E-1, & E \geq 3 \\ 1, & \text{otherwise} \end{cases} \qquad (51)$$

where E is a constant determined by equation (52) in consideration of the twice increase of the support region of the filter whenever increasing the number of filtering.

$$E = \log_2 \max(M,N) \qquad (52)$$

In the step S446 of FIG. 16A, a variable k indicating a number of filtering operations for estimating the global illumination is initialized. The step S448 is a process for determining whether the repetition number of filtering operations reaches a repetition number $K_G$. If the current number of filtering operations is equal to the repetition number $K_G$, the image is up sampled in step S453, and the estimated global illumination $\hat{l}_{VG}(x,y)$ is stored in step S454. Alternatively, if the current number of filtering operations is not equal to the repetition number $K_G$, low-pass filtering is performed in step S450 and the number of filtering increases by 1 (k=k+1) in step S452. After the low-pass filtering is performed, the increased number of filtering is compared with the repetition number $K_G$ again in step S448.

Estimation of Local Illumination of V Component Image

The local illumination $l_{VL}(x,y)$ of the V component image is estimated by the local illumination estimator 1406. The estimated global illumination $\hat{l}_{VG}(x,y)$ estimated by the global illumination estimator 1404 is inverted by the inverter 413, and the output of the inverter 413 is multiplied with the $f_V(x,y)$ output from the RGB/HSV converter 1400 by the multiplier 415 such that the estimated global illumination $\hat{l}_{VG}(x,y)$ is removed from the $f_V(x,y)$ in step S456. The output of the multiplier 415 is AM demodulated by the envelope detector 416 such that the local illumination of the V component image is estimated from envelope detector. At the step S457 of FIG. 16A, the local illumination is estimated. Remaining is a part obtained by removing the estimated global illumination from the $f_V(x,y)$. At the step S458, a variable k indicating the repetition number of the filtering is initialized. The JND of the local variation in an image is approximated as equation (53) on the basis of Weber's Law:

$$JND(I) = \mu + \sigma \cdot I \qquad (53)$$

where I is a uniform brightness value of image, JND(I) is the JND value of I, and $\mu$ and $\sigma$ are constants. Using the JND, it is possible to obtain the minimum brightness difference $JND(f_V(x,y))$ which HVS can perceive at a pixel (x,y) of the image.

A pixel of which brightness difference with the center pixel is greater than JND within the filter window is used is the envelope detector $Env_L[\bullet]$ for estimating the local illumination of equation (47) is excluded for restraining the halo effect in an exemplary embodiment. A pixel of which brightness difference with the center pixel is less than JND is filtered by a nonlinear LPF which performs filtering by adjusting the coefficients of the filter according to the difference level of the brightness. In an exemplary embodiment, the image obtained by removing the estimated global illumination $\hat{l}_{VG}(x,y)$ from the input V component image $f_V(x,y)$ is expressed as equation (54).

$$f_{1V}(x,y) = \frac{f_V(x,y)}{\hat{l}_{VG}(x,y)} \qquad (54)$$

A ratio of the brightness difference $|f_{1V}(x,y) - f_{1V}(x-m, y-n)|$ between the brightness of a pixel distant as much as (m,n) from the center pixel (x,y) in the filter window to the JND value $JND(f_{1V}(x,y))$ of the center pixel (x,y) is expressed by J(x,y;m,n) as equation (55).

$$J(x,y;m,n) = \frac{|f_{1V}(x,y) - f_{1V}(x-m, y-n)|}{JND(f_{1V}(x,y))} \qquad (55)$$

According to the value of J(x,y;m,n), a weighting function $\lambda(x,y;m,n)$ for adjusting the coefficients of the filter is defined by equation (56):

$$\lambda(x,y;m,n) = \begin{cases} 0, & \text{if } J(x,y;m,n) > 1 \\ \exp\left[-\frac{J(x,y;m,n) - Th}{1 - Th}\right], & \text{if } Th \leq J(x,y;m,n) \leq 1 \\ 1, & \text{if } J(x,y;m,n) < Th \end{cases} \qquad (56)$$

where Th is a threshold. The estimation of the local illumination using the nonlinear LPF adopting the weighting function $\lambda(x,y;m,n)$ of equation (56) is expressed as equations (57) and (58).

$$\hat{l}_{VL}(x,y) = LPF_L[f_{1V}(x,y)] \qquad (57)$$

$$= \frac{1}{\Lambda(x,y)} \sum_{(m,n) \in W_2} h(m,n)\lambda(x,y;m,n)f_{1V}(x-m, y-n)$$

$$\Lambda(x,y) = \sum_{m \in W_2} h(m,n)\lambda(x,y;m,n) \qquad (58)$$

Through equations (55) to (58), a pixel of which J(x,y;m,n) is greater than 1 is regarded that its brightness difference with the center pixel can be detected. In this case, the pixel is not used for filtering the center pixel (x,y). A pixel of which J(x,y;m,n) is less than Th is regarded that there is little brightness difference with the center pixel, such that the pixel is used for filtering the center pixel (x,y) with the original filter coefficient. In the case of $Th \leq J(x,y;m,n) \leq 1$, the filtering is performed at the center pixel (x,y) using the filter coefficient which decreases from the original filter coefficient in size as J(x,y;m,n) closes to 1. In order for the nonlinear LPF to perform fast filtering, a 1-dimensional filter is applied in horizontal and vertical directions in alternate fashion:

$$f_{1V}^k(x,y) = \frac{1}{\Lambda(x)\Lambda(y)} \qquad (59)$$

$$= \sum_{m \in W_1} \sum_{n \in W_1} h(m)h(n)\lambda(x,m)\lambda(y,n)f_W^{k-1}(m, y - 2^{k-1}n),$$

$$k = 1, 2, \ldots, K_L$$

$$\Lambda(x) = \sum_{m \in W_1} h(m)\lambda(x;m) \qquad (60)$$

where $K_L$ is a repetition number of filtering operations (see S460), and $\lambda(x;m)$ is a 1-dimensional signal in equation (60). $\Lambda(y)$ can be defined as the equation (60). Here, $f_{1V}^0(x,y) = f_{1V}(x,y)$ and $f_{1V}^{K_L}(x,y) = \hat{l}_{VL}(x,y)$. If the number of filtering operations k is less than $K_L$ at step S460, the JND-based low-pass filtering is performed in step S462 and the number is increased by 1 in step S464. If the number of filtering operations is equal to $K_L$, the image is up sampled in step S463, and the estimated local illumination is stored in step S466. That is, the JND-based filtering is performed to the repetition number determined by equation (61) in step S462, and the local illumination estimated through the repeated filtering is stored in step S466.

In the case that the envelope detector 416 is implemented with a JND-based filter, simulation results have shown that the filter gives the best performance when the maximum support region of the linear LPF is 1/64 of the input image in 1-dimensional size. On the basis of the simulation result, the repetition number $K_L$ to the input image of M×N size is determined as equation (61):

$$K_L = \begin{cases} E - 5, & E \geq 7 \\ 1, & \text{otherwise} \end{cases} \qquad (61)$$

where E is a constant determined by equation (52). The halo effect in an output image obtained from an input image having strong edges can be restrained by the nonlinear low-pass filtering with the adjustment of the coefficients of the filter using JND. If there is little possibility of the occurrence of the halo effect due to no storing edge in the input image so that the filtering is implemented without JND, a weighting function is set to 1. In this case, equation 59 represents a linear low-pass filtering. Finally, the reflectance $r_V(x,y)$ of the V component image is estimated using equation 48.

Estimation of Reflectance of V Component Image

The reflectance estimator 1408 includes an inverter 418 for inverting the output of the multiplier 415 through the envelope detector 416, and a multiplier 420 for multiplying the output of the inverter 418 and the output of the multiplier 415. This can be expressed with an equation at step S468 of FIG. 16B. At step S468, the reflectance is estimated and the estimated reflectance is stored at step S470.

Enhancement of global/local illuminations and reflectance of V component image of a color image If the global and local illuminations and reflectance of the V component image are estimated at step S472, a gamma correction is performed on the estimated global and local illuminations and reflectance. In FIG. 15, the global/local illuminations and reflectance enhancer 1410 includes correctors 419 and 417 for decreasing the dynamic ranges of the global and local illuminations estimated by the global and local illumination estimators 1404 and 1406, and a corrector 421 for increasing the contrast of the reflectance estimated by the reflectance estimator 1408. The V component image enhancer 1416 includes a multiplier 422 for multiplying the outputs of the correctors 419 and 417 of the global/local illumination and reflectance enhancer 1410 with each other, a multiplier 423 for multiplying the output of the multiplier 422 and the output of the corrector 421, and a corrector 425 for correcting the brightness range of the output from the multiplier 423 to adjust to the brightness range of an output device.

Figure 17A:
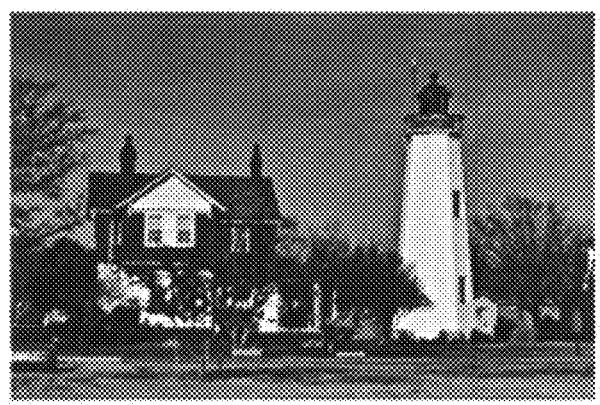
FIGS. 17A and 17B illustrate images obtained by the color image enhancement method of FIGS. 16A and 16B with and without adopting JND.
Figure 17B:
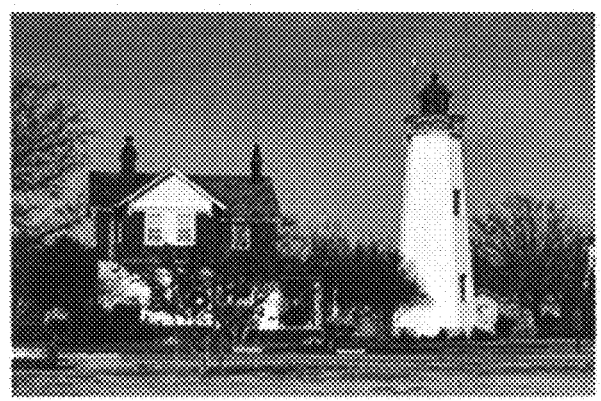

After the global and local illuminations and the reflectance are estimated in step S472, the dynamic ranges of the global and local illuminations $\hat{l}_{VG}(x,y)$ and $\hat{l}_{VL}(x,y)$ estimated from the input V component image $f_V(x,y)$ are decreased by applying the functions $g_{1G}(\bullet)$ and $g_{1L}(\bullet)$ of the correctors 419 and 417 in step S474, and the contrast of the estimated reflectance $\hat{r}_V(x,y)$ is increased by applying the function $g_2(\bullet)$ of the corrector 421. Consequently, the outputs of the correctors 419 and 417 are multiplied with each other on the basis of equation 27 by the multiplier 422, and the output of the multiplier 422 and the corrector 421 are multiplied with each other such that an enhanced output V component image $\hat{f}_V(x,y)$ is obtained as equation (62):

$$\hat{f}_V(x,y) = (\hat{l}_{VG}(x,y))^{\alpha_1} \cdot (\hat{l}_{VL}(x,y))^{\alpha_2} \cdot (\hat{r}_V(x,y)) \quad (62)$$

where $\alpha_1$ and $\alpha_2$ are constants used in the gamma corrections for decreasing the dynamic ranges of the estimated global illumination $\hat{l}_{VG}(x,y)$ and the estimated local illumination $\hat{l}_{VL}(x,y)$, $\beta$ is a constant used in the gamma correction for increasing the contrast of the estimated reflectance $\hat{r}_V(x,y)$. These constants are selected to satisfy a condition of $0 \leq \alpha_1 \leq \alpha_2 \leq \beta \leq 1$ in consideration that a low frequency band much affects the dynamic range of an image and the HVS is more sensitive to the dark region than the bright region. These constants are determined according to a taste of a user such as the contrast, brightness, and naturalness of the output color image. The brightness range of the output V component image $\hat{f}_V(x,y)$ is adjusted to that of the brightness range of the output device by $g_2(\bullet)$ as in equation (21) such that the final output V component image $\tilde{f}_V(x,y)$ is obtained. At step S476, the histogram modeling method (A. K. Jain, Fundamentals of "Digital Image Processing," Englewood Cliffs, N.J., Prentice-Hall, 1989) is used with the function of $g_3(\bullet)$ as equations (63) and (64):

$$\tilde{f}_V(x,y) = \left\lfloor \frac{(s - s_{min})}{1 - s_{min}}(L_2 - 1) + 0.5 \right\rfloor \quad (63)$$

$$s = \frac{\sum_{i}^{q} h_v^V(V_j)}{\sum_{j=0}^{L_1-1} h_v^V(V_j)}, \quad q = \hat{f}_V(x,y) \quad (64)$$

where $s_{min}$ is a minimum value of s, $V_j$ is the $j^{th}$ brightness value ($j=0,1,\ldots,L_{I-1}$) of the output V component image $\tilde{f}_V(x,y)$, and $h_v(V_j)$ is the histogram of $V_j$. $\chi$ is a constant for determining a histogram shape of the final output V component image $\tilde{f}_V(x,y)$, and $L_2-1$ is a maximum value of the brightness of the final output V component image $\tilde{f}_V(x,y)$. If $\chi=0$, there is little variation in the histogram shape. If $\chi=1$, the histogram shape closes to a uniform distribution so as to obtain the same result of the histogram equalization method. In order to compensate the shortcoming of the histogram equalization while maintaining the histogram shape of the output V component image $\hat{f}_V(x,y)$ to some extent, $\chi$ is as a value close to 0 satisfying $0 \leq \chi \leq 1$. The brightness range of the final output V component image $\tilde{f}_V(x,y)$ is determined by $L_2$ regardless of the output V component image $\hat{f}_V(x,y)$, whereby it is required to select a value of $L_2$ which enables adjusting the brightness range of the final output V component image $\tilde{f}_V(x,y)$ to that of the output device. In an exemplary embodiment, the histogram modeling method represented by $g_3(\bullet)$ of corrector 425 generates the final output V component image $\tilde{f}_V(x,y)$ of which histogram shape is maintained as the output V component image $\hat{f}_V(x,y)$ to some extent while its brightness range is corrected regardless of the output V component image $\hat{f}_V(x,y)$. The histogram modeling shows a better result than using $g_3(\bullet)$ for the gain/offset correction in which constants used for the gain/offset correction are set to different values according to the output V component image $\hat{f}_V(x,y)$ for adjusting the brightness range of the final output V component image $\tilde{f}_V(x,y)$ to that of the output device. In step 478, the final output V component image obtained through these processes is converted into the RGB output color image with the original H and S component images by the HSV/RGB converter 1402 of FIG. 14 and the image is output in step 480. FIGS. 17A and 17B illustrate output color images obtained by enhancing the input image of FIG. 8A according to an exemplary embodiment of the present invention.

In order to show the effect of JND-based nonlinear low-pass filtering, a final output color image obtained when a linear low-pass filtering is used without adopting the JND is shown together. The constants used for the gamma correction in equation (62) are set to $\alpha_1=0.2$, $\alpha_2=0.4$, and $\beta=0.8$ that show the best result in the simulations, and the constants used for the histogram modeling in equation $L_2$ and $\chi$ in equations (63) and (64) are set to 256 and 0.2.

Figure 8A:
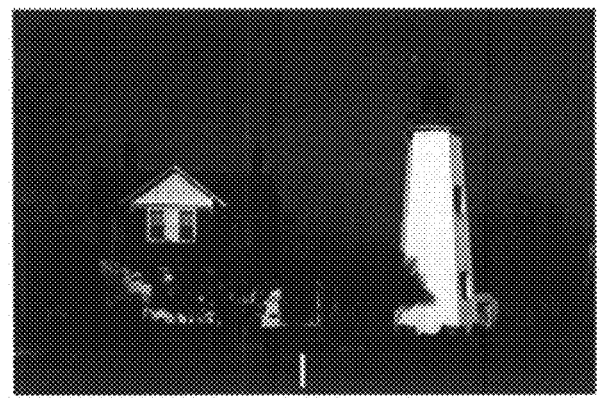
FIGS. 8A to 8C illustrate an input image and output images generated by applying MSR and MSRCR methods, respectively.
Figure 8B:
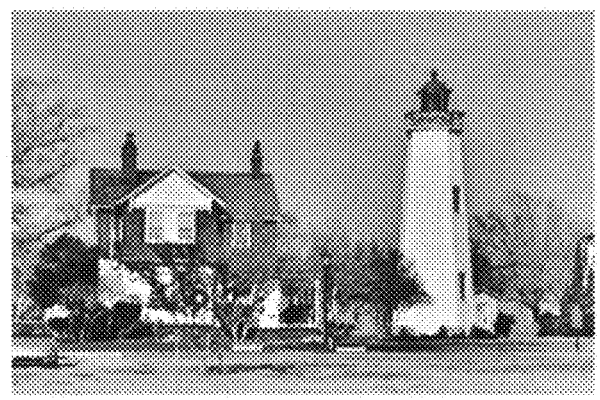
Figure 8C:
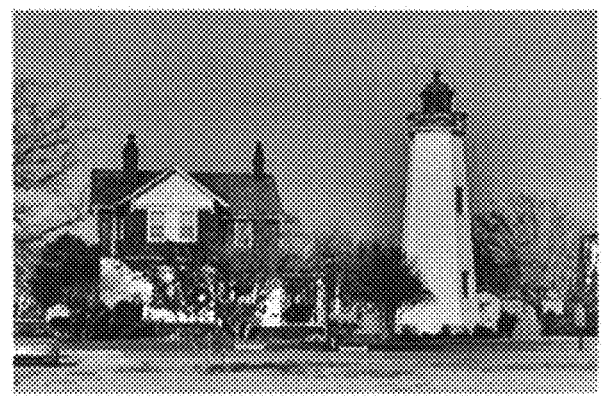

FIG. 17A illustrates an output image obtained by enhancing the input image of FIG. 8A without adopting the JND according to an embodiment of the present invention. As shown in FIG. 17A, the output image does not show a color variation, unlike the output image of the MSRCR, and entirely well enhanced. However, the halo effect is shown close around the tower and trees.

FIG. 17B illustrates a final output color image obtained by enhancing the input image of FIG. 8A with the JND according to an exemplary embodiment of the present invention. As shown in FIG. 17B, the final output color image obtained by adopting the JND is well enhanced without any halo effect.

Figure 18A:
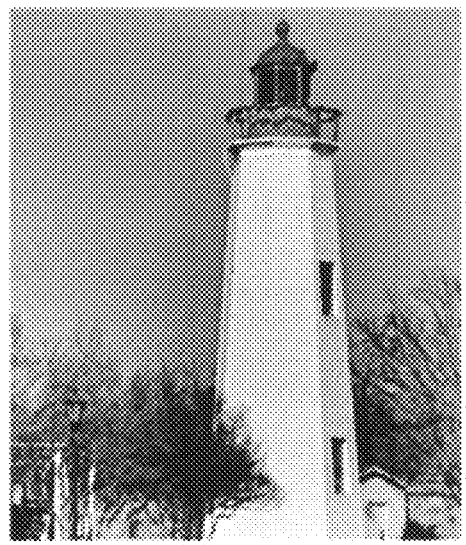
FIGS. 18A to 18C illustrate partially enlarged input image and output images obtained by a color image enhancement method of FIGS. 16A and 16B with and without adopting JND.
Figure 18B:
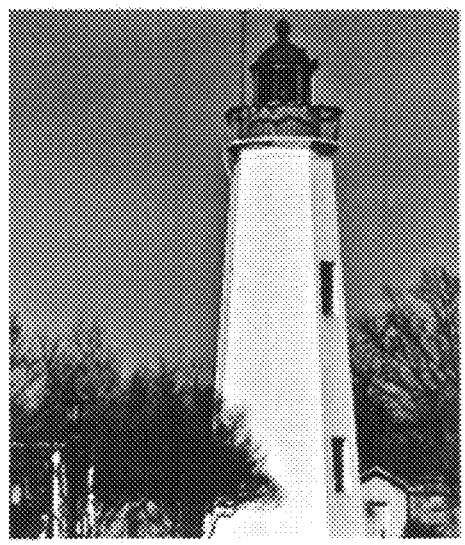
Figure 18C:
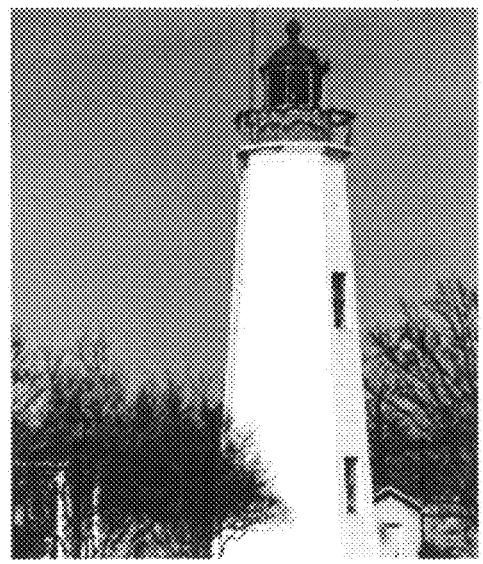

FIGS. 18A to 18C are partially enlarged images of the final output color images enhanced by the image enhance method according to an exemplary embodiment of the present invention.

As shown in FIG. 18A, the halo effect is widely occurred around the tower and the branches of the trees are shown partially bright and partially dark due to the halo effect. In FIG. 18B, which is the final output color image that is obtained without adopting JND, the halo effect caused by the global illumination is restrained. However, a narrow halo effect occurs close around the tower. In FIG. 18C, however, the final output color image obtained by adopting the JND does not show the halo effect caused by the local illumination. From the images of FIGS. 17A, 17B, and 18A to 18C, it is known that an exemplary image enhancement method of the present invention increases both the global and local contrasts well on the basis of the advanced image formation model. Also, it is known that the JND-based nonlinear LPF can restrain the halo effect, and the output color image can be obtained without color variation by improving only the V component image of the input color image.

In order to evaluate the performance of an exemplary image enhancement method of the present invention, a simulation image database is built with RGB color images of size 2000×1312 downloaded from National Aeronautics and Space Administration (NASA) homepage and RGB color images of size 352×288 of Motion Picture Experts Group 7 (MPEG-7) Common Color Dataset (CCD). The images are processed with the conventional histogram equalization method, MSRCR, and the image enhancement method of the present invention and compared with each other in quality of output images. For fair performance evaluation, in the histogram equalization method, only the V component image of an HSV color image converted from an RGB color image is improved, and then the output RGB image is obtained using the input H and S component images and the improved V component image, as in an exemplary image enhancement method of the present invention. In the MSRCR method, all the constants are set to the same values used in an exemplary image enhancement method of the present invention.

Figure 19A:
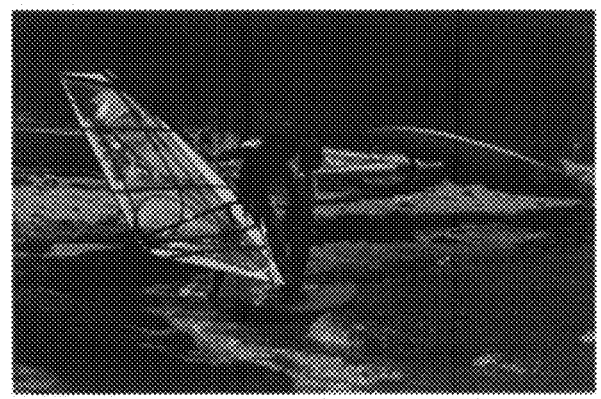
FIGS. 19A to 19D illustrate a NASA1 input color image, output color images by a histogram equalization method, MSRCR method, and an image enhancement method according to an exemplary embodiment of the present invention.
Figure 19B:
Figure 19C:
Figure 19D:

FIGS. 19A to 19D illustrate a NASA1 input color image, output color images obtained by the histogram equalization method, MSRCR method, and an exemplary image enhancement method of the present invention. In FIG. 19A, the input image shows grass and moss, dark and weak edges, and a blue surfing board having deep saturation. In the output color image of FIG. 19B obtained by the histogram equalization method, the global contrast is increased such that the sail and sands, that are bright in the input image, are much brightened, and the contrasts around the dark and weak edges of the grass and moss are decreased. In the output color image of FIG. 19C by the MSRCR method, the local contrasts around the weak edge of the grass and moss are increased, but the colors of some parts of the grass are changed from green to violet due to the color variation and the saturation of the surfing board is weakened by a gray-world violation. Meanwhile, in the output color image of FIG. 19D by an exemplary image enhancement method of the present invention, the contrasts of the bright and dark regions of the input color image are entirely maintained while the local contrasts around the dark and weak edges of the grass and moss are well increased.

Figure 20A:
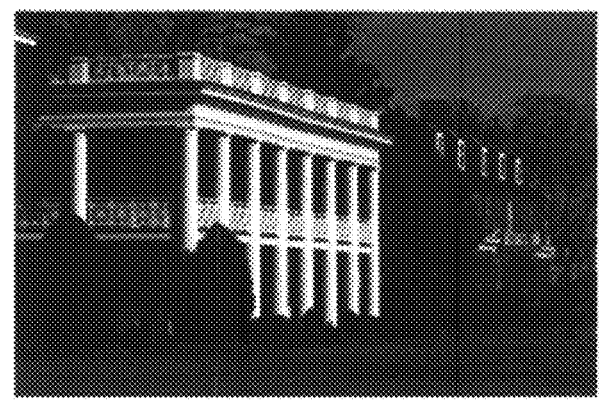
FIGS. 20A to 20D illustrate a NASA2 input color image, output color images by a histogram equalization method, MSRCR method, and image enhancement method according to an exemplary embodiment of the present invention.
Figure 20B:
Figure 20C:
Figure 20D:

FIGS. 20A to 20D illustrate a NASA2 input color image and output color images obtained by the histogram equalization method, MSRCR method, and an exemplary image enhancement method of the present invention, respectively. In FIG. 20A, the input image shows bright pillars having storing edges and dark trees having weak edges. In the output color image of FIG. 20B by the histogram equalization method, the bright pillars are much brightened and the dark trees are much darkened such that the global contrast of the image is increased, but the local contrast is poorly increased since the terrace and trees are still dark. In the output image of FIG. 20C by the MSRCR method, the local contrast around the white pillars and the trees is increased, but the spaces between the pillars are dark yet and the trees between the building of blue roof and the white pillars are partially darkened. In the output image of FIG. 20D by an exemplary image enhancement method of the present invention, the trees between the building of blue roof and the white pillars are not darkened while the contrast is increased as in FIG. 20C.

Figure 21A:
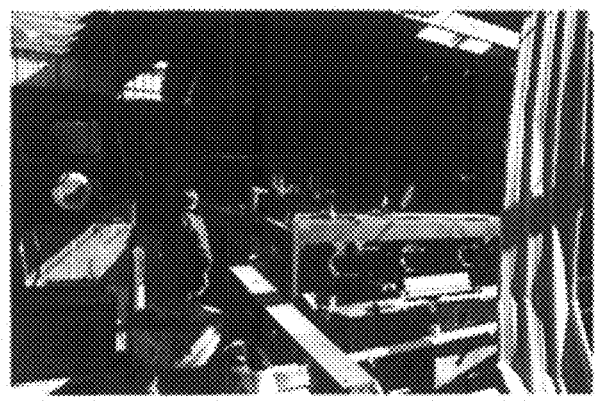
FIGS. 21A to 21D illustrate a CCD1 input color image, output color images by a histogram equalization method, MSRCR method, and an image enhancement method according to an exemplary embodiment of the present invention.
Figure 21B:
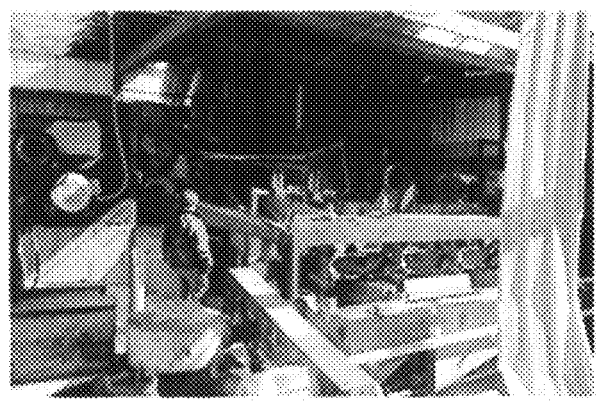
Figure 21C:
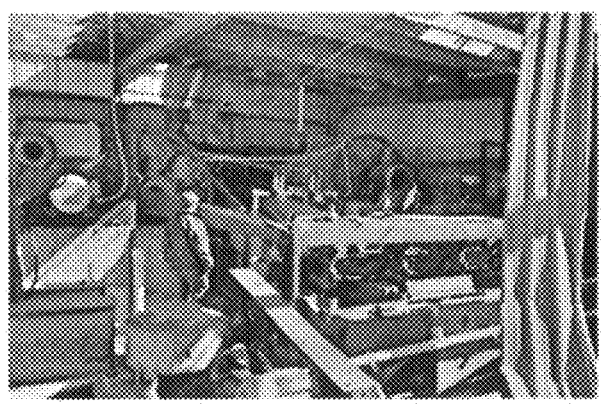
Figure 21D:
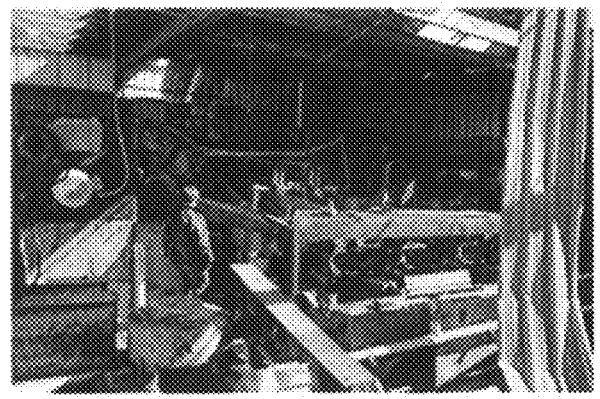

FIGS. 21A to 21D illustrate a CCD1 input color image and output color images obtained by the histogram equalization method, MSRCR method and an exemplary image enhancement method of the present invention, respectively. In FIG. 21A, the input image is dark in most regions and partially bright in some regions. In the output color image of FIG. 21B by the histogram equalization method, the dark region around the sawteeth is much darkened and the partially bright regions are much brightened due to the increase of the global contrast. However, the local contrast of the region around the sawteeth is decreased. In the output color image of FIG. 21C by the MSRCR method, the local contrast of the region around the sawteeth is increased, and the saturation of red steel beam is weakened. Also, the global contrast is not increased enough as in the output color image of FIG. 21B. In the output color image of FIG. 21D by an exemplary image enhancement method of the present invention, the local contrast of the area around the sawteeth is increased without the saturation change while the brightness differences between the shadowed dark region and the partially bright regions are maintained.

If a color or a black and white image is input through a camera or an another image acquisition device, the black and white image is processed by the image enhancement system of FIG. 10 through the flow of FIG. 11, and the color image is processed by the image enhancement system of FIG. 14 through the flowchart of FIG. 16, such that an enhanced image is output to an output device.

The image processing device may include an input unit for receiving a black and white image or a color image, a memory unit for storing application programs for processing the images input through the input unit, and an image processing unit for estimating global and local illuminations and reflectance of the input image through the input unit and producing an output image by enhancing the estimated components. The image processing device processes the black and white image using the system of FIG. 10 through the procedure of FIG. 11 and processes the color image using the system of FIG. 14 through the procedure of FIG. 16.

The image processing device can be adapted to a camera as well as portable devices and other communication devices equipped with a camera.

In an exemplary image enhancement system and method of the present invention, the estimated global and local illuminations and reflectance are enhanced by gamma-corrections and the histogram modeling is applied to the output V component image that is obtained by multiplying the enhanced global and local illuminations and reflectance.

As described above, the image enhancement system and method of an exemplary embodiment of the present invention converts an input RGB color image into an HSV color image and improves only the V component image of the HSV color image. From the V component image, the global illumination is estimated using a linear LPF having wide support region and then the local illumination is estimated by applying a JND-based nonlinear LPF having narrow support region to an image obtained by removing the estimated global illumination from the V component image. The reflectance is estimated by removing the estimated global and local contrasts, from the V component image.

Although exemplary embodiments of the present invention are described in detail hereinabove, it should be clearly understood that many variations and/or modifications of the basic inventive concepts herein taught which may appear to those skilled in the present art will still fall within the spirit and scope of the present invention, as defined in the appended claims and their equivalents.

What is claimed is:

1. An image enhancement system comprising:
   a global illumination estimator device for estimating a global illumination from a value (V) component image of an input image;
   a local illumination estimator device for estimating a local illumination using the V component image and the estimated global illumination;
   a reflectance estimator device for estimating a reflectance using the V component image, the estimated global illumination, and the estimated local illumination;
   a global/local illumination and reflectance enhancer device for performing gamma corrections on the estimated global and local illuminations to decrease the dynamic ranges and for performing a gamma correction on the estimated reflectance to increase contrast of the estimated reflectance; and
   a brightness corrector device for outputting an output V component image obtained by multiplying the gamma corrected estimated global illumination by the gamma corrected estimated local illumination, both of which are output from the global/local illumination and reflectance enhancer, and for adjusting the brightness range of the output V component image to a brightness range of an output device.

2. The image enhancement system of claim 1, wherein the global illumination estimator device comprises an envelope detector.

3. The image enhancement system of claim 2, wherein the envelope detector comprises a linear low-pass filter (LPF) having wide support region.

4. The image enhancement system of claim 3, wherein the linear low-pass filter (LPF) comprises a filter represented by equation:

$$\hat{I}_{VG}(x, y) = LPF_G[f_V(x, y)]$$
$$= \sum_{(m,n) \in W_2} h(m, n) f_V(x - m, y - n)$$

where $\hat{I}_{VG}(x,y)$ is the estimated global illumination, $h(m,n)$ is the linear LPF, m denotes the index of horizontal direction, n denotes the index of vertical direction, $f_v(x, y)$ is an input V component image, and $W_2$ is a 2-dimensional filter window.

5. The image enhancement system of claim 4, wherein the linear low-pass filter comprises a filter represented by following equation for 1-dimensional fast filtering:

$$f_V^k(x, y) = \sum_{m \in W_1} \sum_{n \in W_1} h(m)h(n)f_V^{k-1}(x - 2^{k-1}m, y - 2^{k-1}n),$$
$$k = 1, 2, \ldots, K_G$$

where k is the number of filtering, m denotes the index of horizontal direction, n denotes the index of vertical direction, $W_1$ denotes a 1-dimensional filter window, and $K_G$ is a repetition number of filtering.

6. The image enhancement system of claim 5, wherein the repetition number of filtering operations $K_G$ is determined by equation:

$$K_G = \begin{cases} E - 1, & E \geq 3 \\ 1, & \text{otherwise} \end{cases}$$

7. The image enhancement system of claim 6, wherein E is determined at each filtering operation by equation:

$$E = \log_2 \max(M, N)$$

where M and N are the horizontal and vertical sizes of image, respectively.

8. The image enhancement system of claim 5, wherein the linear low-pass filter (LPF) comprises:
   a just noticeable difference (JND) recognizer for recognizing a minimum brightness difference (JND) which human visual system can perceive at a pixel of the image; and
   a filter coefficient adjuster for excluding a pixel of which brightness difference with that of a center pixel in a filter window is greater than the JND and adjusting coefficients of the filter in accordance with the brightness difference level of a pixel of which brightness difference with that of the center pixel is less than JND.

9. The image enhancement system of claim 1, wherein the local illumination is estimated by applying a nonlinear low-pass filter (LPF) to an intermediate image obtained by removing the estimated global illumination from the V component image with following equations:

$$\hat{I}_{VL}(x, y) = LPF_L[f_{1V}(x, y)]$$
$$= \frac{1}{\Lambda(x, y)} \sum_{(m,n) \in W_2} h(m, n)\lambda(x, y; m, n)f_{1V}(x, y)$$

and $$\Lambda(x, y) = \sum_{(m,n) \in W_2} h(m, n)\lambda(x, y; m, n)$$

where $\hat{I}_{VL}(x,y)$ is the estimated local illumination, $$f_{1V}(x, y) = \frac{f_V(x, y)}{\hat{I}_{VG}(x, y)}, f_V(x, y)$$

$f_V(x,y)$ is an input V component image, $\hat{I}_{VG}(x,y)$ is the estimated global illumination, $h(m,n)$ is the linear LPF, m denotes the index of horizontal direction, n denotes the index of vertical direction, $J(x,y; m,n)$ is a ratio of a difference $|f_{1V}(x,y) - f_{1V}(x-m, y-n)|$ between a brightness of a center pixel $(x,y)$ and a brightness of a pixel distant away as much as $(m, n)$ from the center pixel to a just noticeable difference (JND)

of the center pixel (x,y), and λ(x,y; m,n) is a weighting function for adjusting the coefficients of the filter according to a value of J(x,y; m,n), and $W_2$ is a 2-dimensional filter window.

10. The image enhancement system of claim 9 wherein the nonlinear low-pass filter (LPF) is a 1-dimensional filter and the brightness is obtained by following equations:

$$f_{IV}^k(x, y) = \frac{1}{\Lambda(x)\Lambda(y)} \sum_{m \in W_1} \sum_{n \in W_1} h(m)h(n)\lambda(x; m)\lambda(y; n) f_{IV}^{k-1}(x - 2^{k-1}m, y - 2^{k-1}n),$$

$$k = 1, 2, \ldots, k_L \text{ and}$$

$$\Lambda(x) = \sum_{m \in W_1} h(m)\lambda(x; m)$$

where k is a number of filtering, m denotes the index of horizontal direction, n denotes the index of vertical direction, $W_1$ denotes a 1-dimensional filter window, and $K_L$ is a repetition number of filtering operations.

11. The image enhancement system of claim 10, wherein the non-linear filter comprises a JND-based low-pass filter (LPF).

12. The image enhancement system of claim 11, wherein the JND-based low-pass filter (LPF) operates with equation:

$$\lambda(x, y; m, n) = \begin{cases} 0, & \text{if } J(m, n) > 1 \\ \exp\left[-\frac{J(x, y; m, n) - Th}{1 - Th}\right] & \text{if } Th \leq J(m, n) \leq 1 \\ 1, & \text{if } J(m, n) < Th \end{cases}$$

where Th is a threshold value.

13. The image enhancement system of claim 1, wherein the reflectance is estimated with equation:

$$\hat{r}_V(x, y) = \frac{f_V(x, y)}{\hat{I}_{VG}(x, y) \cdot \hat{I}_{VL}(x, y)}$$

where $\hat{I}_{VG}(x,y)$ and $\hat{I}_{VL}(x,y)$ are the estimated global and local illuminations, and $f_V(x,y)$ is the V component image.

14. A color image enhancement system comprising:
an RGB/HSV converter device for converting RGB component images of an input image into HSV component images;
a global illumination estimator device for estimating a global illumination from a V component image among the HSV component images;
a local illumination estimator device for estimating a local illumination using the V component image and the estimated global illumination;
a reflectance estimator device for estimating a reflectance using the V component image, the estimated global illumination, and the estimated local illumination;
a global/local illumination and reflectance enhancer device for performing gamma corrections on the estimated global and local illuminations to decrease the dynamic ranges of the global and local illuminations and for performing a gamma correction on the estimated reflectance to increase a contrast of the estimated reflectance;
a brightness corrector device for outputting an output image obtained by multiplying the gamma corrected estimated global illumination by the gamma corrected estimated local illumination, both of which are output from the global/local illumination and reflectance enhancer, and for adjusting a brightness range of the output V component image to a brightness range of an output device; and
an HSV/RGB converter device for reproducing an output color image by converting the enhanced V component image along with the H and S component images into an RGB component images.

* * * * *